United States Patent
Nguyen et al.

(10) Patent No.: US 11,934,370 B1
(45) Date of Patent: Mar. 19, 2024

(54) DATA STORE INDEXING ENGINE WITH AUTOMATED REFRESH

(71) Applicant: Amazon Technologies, Inc., Seattle, WA (US)

(72) Inventors: Long Nguyen, Detroit, MI (US); Dominic Corona, Rochester Hills, MI (US); Fletcher Liverance, Oakland, CA (US)

(73) Assignee: Amazon Technologies, Inc., Seattle, WA (US)

( * ) Notice: Subject to any disclaimer, the term of this patent is extended or adjusted under 35 U.S.C. 154(b) by 429 days.

(21) Appl. No.: 15/838,299

(22) Filed: Dec. 11, 2017

(51) Int. Cl.
*G06F 16/22* (2019.01)
*G06F 16/24* (2019.01)
*G06F 16/81* (2019.01)

(52) U.S. Cl.
CPC ...... *G06F 16/2272* (2019.01); *G06F 16/2291* (2019.01); *G06F 16/24* (2019.01); *G06F 16/81* (2019.01)

(58) Field of Classification Search
CPC .. G06F 16/2272; G06F 16/2291; G06F 16/24; G06F 16/81
See application file for complete search history.

(56) References Cited

U.S. PATENT DOCUMENTS

| | | |
|---|---|---|
| 6,338,056 B1 | 1/2002 | Dessloch et al. |
| 6,556,986 B2 | 4/2003 | Hara et al. |
| 2008/0114787 A1 | 5/2008 | Kashiyama et al. |
| 2009/0030883 A1* | 1/2009 | Das ........................ G06F 16/22 |
| 2011/0202541 A1* | 8/2011 | Permandla .............. G06F 16/31 |
| | | 707/742 |
| 2012/0254148 A1* | 10/2012 | Xiao ................... G06F 16/2458 |
| | | 707/708 |
| 2015/0213043 A1* | 7/2015 | Ishii ...................... G06F 16/211 |
| | | 707/741 |
| 2017/0004531 A1* | 1/2017 | Seetharama ........ G06F 16/9535 |

\* cited by examiner

*Primary Examiner* — Irete F Ehichioya
*Assistant Examiner* — Xiaoqin Hu
(74) *Attorney, Agent, or Firm* — Robert C. Kowert; Kowert, Hood, Munyon, Rankin & Goetzel, P.C.

(57) ABSTRACT

Systems and methods are disclosed to implement an indexing engine that maintains an index in an index store for a storage object in a data store. In embodiments, the index store may be implemented using an in-memory storage cluster separate from the data store. The storage object may have multiple indexes, which may have different filtering or sorting criteria for the data. In embodiments, updates to the storage object are received as an update stream by the indexing engine. Based on configurable indexing rules, the indexing engine applies the updates to the appropriate indexes. To service a query to the data store, a query engine first retrieves a set of keys satisfying the query from the index store, and then data corresponding to the keys from the data store or another index. In embodiments, the index may be refreshed via touch updates of selected data in the storage object.

20 Claims, 19 Drawing Sheets

```
indexing rules
     410
```

```
{                                                    index rule group header
     index_group: {                                              412
          cluster: CLUSTER_1,
          keyspace: Users
     },
     triggers: [
```

```
                                                         indexing rule
          {                                                   414
               index_name: users_by_age,
               index_key: ${#Customer_ID},
               sort_key: ${#Age},
               filter: NONE
          },
```

```
                                                         indexing rule
          {                                                   416
               index_name: sea_users_by_purchases,
               index_key: ${#Customer_ID},
               sort_key: ${#Purchases descending},
               filter: ${#Location == 'Seattle'}
          },
```

```
                                                         indexing rule
          {                                                   418
               index_name: locations_by_purchases,
               index_key: ${#Location},
               sort_key: ${avg(#Purchases) descending},
               filter: ${#Location in ('Seattle', 'Austin', 'Dallas')}
          }
     ]
},
```

DATA STORE INDEXING ENGINE WITH AUTOMATED REFRESH

BACKGROUND

Companies often operate large data centers to provide the resources to handle customer's needs. Recently, a "cloud" computing model has enabled companies to lease computing resources on an as-needed basis from providers. Cloud computing is the delivery of computing resources as a service over a network such as the Internet. Instead of the company maintaining the data center at a facility owned by the company, the company can lease use of a virtual data center provided by a third-party provider.

One aspect of cloud services is cloud storage, where the service provider leases virtual storage space to various companies or individuals. For example, some cloud storage services allow users to store structured data in data centers around the world via a web interface. In some cloud storage services, it is useful to maintain indexes of data objects in various indexes to facilitate frequently performed queries. For example, an index may store a set of data records in particular sort order that is useful for certain queries. However, in some cases, the cloud storage service may impose usage or technical limits on the use of indexes that are not convenient for clients. For example, in some cases, the cloud storage service may place a limit on the number, size, or usage of indexes. In some cases, the implementation of indexes in the storage service may not be expressive enough to create a view of the data as desired by the user. In some cases, the indexes are not easily configurable via the interfaces of the storage service. Accordingly, there is a need for improved systems and methods for creating, configuring, and using indexes for data objects stored in cloud storage services.

BRIEF DESCRIPTION OF THE DRAWINGS

FIG. 4 illustrates examples indexing rules for different indexes in an example data store indexing system, according to some embodiments.

Figure 1:
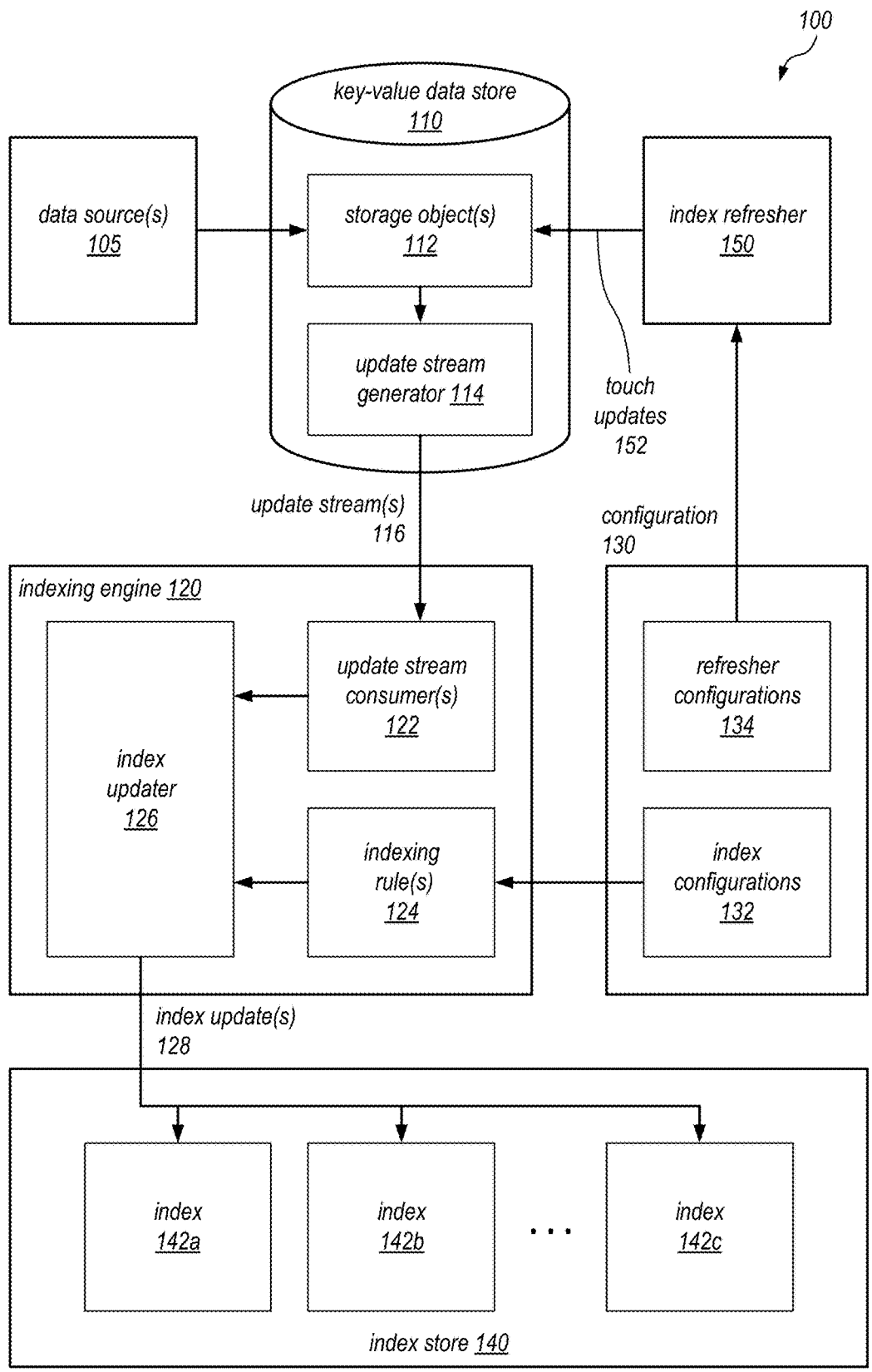
FIG. 1 is a block diagram illustrating an example data store indexing system that performs automated refreshing of indexes, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

The systems and methods described herein may be employed in various combinations and in embodiments to implement a data store indexing system that performs automated refreshing of its indexes. Combinations of the components and techniques described herein improve the functioning of existing data stores and indexing systems. In embodiments, the system may employ an index store to maintain indexes for storage objects in the data store, where the index store and the data store are two separate data storage systems. In some embodiments, the data store may be a key-value data store that is optimized for storing data on persistent storage. In some embodiments, the index store may be implemented using an in-memory storage cluster that is optimized for fast queries. A storage object in the data store may project multiple indexes in the index store, which may be defined according to different indexing rules specifying different filtering or sorting criteria for the indexes. In some embodiments, updates to the storage object are received as an update stream by an indexing engine. Based on the indexing rules, the indexing engine applies the updates to the appropriate indexes in the index store. In some embodiments, to service a query to the data store, a query engine first retrieves a set of keys satisfying the query from the index store, and then data corresponding to the keys from the data store or another index. In some embodiments, the index may be refreshed via touch updates of selected data in the storage object. Indexes may be refreshed in response to a number of conditions, such as an indexing rule change, a query, a refresh command, or according to a specified schedule.

As may be understood, the decoupling of the data store and index store achieves a number of benefits. For one thing, the decoupled architecture allows both the data store and index store to be implemented and optimized for their respective roles in the system. The data store can be optimized for just the writing and storing of data, while the index store can be optimized to handle queries without being subjugated to the various constraints of the data store. For example, the index store may be optimized for query speed, while the data store may be optimized for fast updates and durability. Moreover, because the index store relies on very little from the data store in terms of functionality, its operations do not add substantial burdens to the data store. For example, an update to a storage object in the data store may be populated to multiple indexes without generating any additional reads or writes in the data store. In addition, the decoupled nature of the index store and the data store also means that the index store becomes largely agnostic to the implementation details of the data store. Thus, the index store may be adapted for use with a variety of data stores with only minor adjustments to the indexing rules.

The index engine further improves the indexing system by exposing the indexes as an intuitive set of indexing rules, which allows the indexing to be configured via a simple user interface. The simple configuration interface allows storage objects in the data store to be easily projected into index objects in the index store, without having to statically define indexes in the data store. The speed of population of the indexes may also be controlled via the configuration interface, so that more important indexes can be refreshed more frequently, while less important indexes are refreshed at a slower pace. In embodiments, the indexes may also be configured to be refreshed automatically based on detected conditions (e.g., indexing rule changes), so that little or no manual administration of the index store is required.

Embodiments of a data store indexing system as described herein may be used to create, configure, maintain, and use indexes for storage objects in a data store. For example, an index may be created for a table in a database, so that the index may be used to service certain queries against the table more quickly. For example, an index may store data records from the table in a sorted order that may be used to quickly find a range of records for range queries. However, in some cases, the data store may lack an implementation for indexes or implement them in a way that is not convenient for clients. For example, in some cases, a cloud storage service that host indexes may place a limit on the number, size, or usage of indexes. In some cases, the implementation of indexes in the data store or storage service may not be expressive enough to create a view of the data as desired by the user. In some cases, the indexes are not easily configurable via the interfaces of the data store or storage service.

To mitigate these and other problems with current data stores and indexing systems, embodiments of data store indexing systems herein maintain indexes in an index store that is external to or separate from the data store itself. By moving the indexes outside of the data store, the indexes are no longer constrained by the limits of the data store. In some embodiments, the index store may be generated and refreshed via an update stream from the data store. The update stream may contain a time-ordered sequence of updates to one or more storage objects in the data store, such that listeners of the stream will receive near real-time updates to the data store. In some embodiments, the update stream may be received by an indexing engine. The indexing engine may consume each update record in the stream, and applied the indexing rules to determine which indexes are impacted by the update, perform any needed computations to the incoming update, and then apply the update to the impacted indexes in the index store.

In some embodiments, the indexes in the index store may be defined according to indexing rules. The indexing rules may specify, depending on the embodiment, parameters such as the filtering or sorting criteria for each index. In some embodiments, these rules may be easily configurable by ordinary users via a configuration interface, so that the users may easily create a variety of indexes to suit their own needs. In some embodiments, the indexing rules may be stored in a human-readable format, for example, in a configuration language. The indexing rules may allow users to specify a variety of parameters, such as different filtering and sorting criteria, manners of grouping of data items, merging of multiple storage objects, etc. In some embodiments, the rules may support complex logical expressions. These rules may be configured via a simple user interface, without having to define static data structures in either the data store or the index store.

In some embodiments, the indexing system may continually or periodically scan the storage objects in the data store that support indexes in the index store, and cause any data that are relevant to the indexes to be received by the indexing engine (e.g., by causing certain data items to be placed in the update stream). In some embodiments, the indexing system may perform an ad-hoc refresh operation to push certain data items from the storage object into the index store. This may occur, for example, when an indexing rule for a particular index changes. Upon the change, the indexing system may cause relevant data items in the storage object to be pushed to the index store, so that the newly configured index can be quickly repopulated. In some embodiments, the pushing of data items may be performed via a touch update that updates a metadata attribute of the data items. These refresh operations may occur automatically and as needed, so that the contents of the index are stays relatively up-to-date with respect to the data in the storage object.

In some embodiments, the indexing system may include a query engine or query interface, which allows clients to easily obtain data items from the indexes according to desired filtering and/or sorting criteria. In some embodiments, the queries may be received via an application programming interface (API) of the indexing system, which may in some embodiments comprise a web service interface. In some embodiments, in response to a query, the query engine may perform two lookups. First, the query engine may find the key identifiers for data items satisfying the query from an index in the index store. Then, the query index may use the determined keys to obtain additional data values from the storage object in the data store. In some embodiments, the fetching of particular data items from the data store by key is much faster than a full scan of the storage object in the data store.

In some embodiments, some or all of the data values of the storage object may be replicated in the index store, even if these data values are not used by any of the indexing rules of the index store. Thus, in such embodiments, the second lookup for data values may be performed fully within the index store, without having to access the data store at all. In some embodiments, the index store may maintain a "universe" index of all data values that may be used by queries to the index store, so that all queries may be serviced by data existing in the universe index.

In some embodiments, during a query, the indexing system may evaluate the indexing rules for a particular index against the data items that are current in the stream repository. In some cases, updates may reside in the stream repository while waiting to be processed by the indexing engine. During a query, the query engine may evaluate the updates in the stream repository against the indexing rules for the index in question, so that the query can return the most up-to-date results. In some embodiments, the index may be updated as a result of the evaluation.

In some embodiments, the index store may be an in-memory data store that can respond to queries with very low latency. In some embodiments, the index store may be implemented using a cluster of compute nodes that collectively host the index store in their combined runtime memories. In some embodiments, the cluster may perform some degree of replication to ensure data availability and durability. For example, failing nodes in the cluster may be automatically replaced by replica nodes. In some embodiments, the cluster may be dynamically scalable according to factors such as the size of the data or the rate or volume of requests. For example, the cluster may organize the in-memory space into multiple independently self-managing shards, so that additional shards can be added or removed from the memory space on an as-needed basis. As may be understood, by using the much faster in-memory data store as the index store, the index store may be optimized for faster reads, whereas the underlying data store is optimized for storage.

In some embodiments, different components of the indexing system may be implemented as independent cloud-based services. For example, the update stream may be implemented has a service that hosts a stream data repository. For example, the index engine may be implemented as a service that is performed by a cluster of compute nodes (physical nodes or virtual machine instances) that are configured to consume multiple update streams from possibly multiple data stores. For example, the index store may be implemented as a service that hosts an in-memory storage using a cluster of specialized nodes. All of these services may be configured to communicate with one another via their respective service call interfaces. Each of these services may also implement features such as replication, auto-scaling, auto-recovery, etc., so that they can adapt to the varying demands of different types of clients. In some embodiments, all of these services may be hosted on a larger cloud-based service provider network, and the indexing system may be quickly configured by combining these smaller services via a service configuration interface of the provider network.

As may be appreciated by those skill in the art, a data store indexing system implemented using the above components and techniques have a number of benefits. For example, the clean decoupling of the index store from the data store allows the two data storage systems to be configured at optimized independently to suit their respective roles in the system. For example, the data store is relieved from the substantial burdens and costs of dealing with user queries. At the same time, the index store may be optimized to handle queries without being subjugated to the various constraints and implementation peculiarities of the data store. The data store may be optimized for the writing and storing of data, while the index store may be optimized for the different ways that the data is read by clients. In some embodiments, the population of the indexes may be performed using the update stream alone, which does not generate any other activity in the data store (e.g., read, writes, or any other operations). In some embodiments, this reduces the cost of using the data store, by reducing the number of users, objects, read and write operations that are handled by the data store.

Moreover, because the index store assumes very little from the data store and relies on only an update stream from the data store, it may be easily used with any type of data store that generates an update stream. The index engine further improves the indexing system by exposing the indexes as an intuitive set of indexing rules, which may be configured via a simple user interface that is separate from the administrative interfaces of both the data store and the index store. In addition, the indexing system may implement a number of automated processes such as periodic or change-driven refresh operations, and query-time rule evaluations, etc., to ensure that the indexes stay relatively up-to-date in the face of changing index definitions and queries. These automated processes may be optimized so that they become large invisible to the clients. These and other features and benefits of the data store indexing system are described in further detail below, in connection with the figures.

FIG. 1 is a block diagram illustrating an example data store indexing system that performs automated refreshing of indexes, according to some embodiments. The figure depicts an embodiment of a data store indexing system 100.

As shown, the data store indexing system 100 includes a data store 110, for example a key-value data store. In some embodiments, the key-value data store 110 may include a number of storage objects 112, such as tables or other indexes, and these storage objects may store data items using an identifying key for each data item and a set of data values or payload for each data item. In some embodiments, the storage object 112 may be partitioned across multiple nodes or locations, and the key for the data items may be used to assign the data item to its node or location. In some embodiments, the data store 110 may be a standalone data store, such as for example, a local database. In some embodiments, the data store 110 may be implemented as a data store service using one or more service endpoints configured to receive and process services requests, such as requests to access tables maintained on behalf of clients by a data store, and/or the items and attributes stored in those tables. In some embodiments, the data store 110 may receive data from one or more data sources 105. The data sources 105 may include for example clients of the data store 110, which may add data to and update the data in the storage object(s) 112, and also query or read the data from the storage object(s) 112.

In some embodiments, a storage object 112 may be a data structure that stores a plurality of data items in structured form, so that they may be efficiently stored and queried. For example, in some embodiments, a storage object 112 may be a table, a view, an index, or the like.

As shown, in some embodiments, the data store 110 may implement an update stream generator 114. The update stream generator 114 may be configured to generate an update stream 116 that includes a sequentially ordered list of all updates that have been made to the storage object 112. In some embodiments, the update stream generator 114 may be part of a standard client interface provided by the data store 110. In some embodiments, update stream 116 may be generated in near real-time, such that update records indicating an update are placed in the stream 116 as soon as the update is applied to the storage object 112. In some embodiments, the upstream generator 114 may be configurable via a configuration interface, so that the formatting and contents of the generated update records may be adjusted to suit the needs of the client consuming the stream.

As may be understood, in some embodiments, it may be important that updates be added to the update stream in the correct order as understood by the data store, so that the index store applies the updates in the correct order. In some embodiments, where the correct ordering of updates is not guaranteed by the update stream, additional metadata may be added to individual update records in the stream to indicate their proper place in the order. For example, in some embodiments, update records may include an official update timestamp or a sequence identifier, which uniquely identifies each update's correct place in the stream.

In some embodiments, the update stream 116 may include one update record per update to the storage object 112. For example, in a row-based table, each update to a data item in a row may be captured by an update record reflecting the update. In some embodiments, the update record may include the end state of the data item after the update has been applied. In some embodiments, the update record may include both the end state of the data item and the beginning state of the data item prior to the update. In some embodiments, the update record may simply reflect only attributes or fields in an updated data item that were changed by the update. In some embodiments, a single update record may reflect changes across multiple storage objects 112. In some embodiments, the stream may be provided via an access interface to various stream clients via a streaming service, which allows the streaming clients to receive the streamed records in a streaming order. The streaming service may itself be a data store that is implementing using a group of provisioned storage nodes, so that the stream can dynamically scale according to the input data volume and recovery from certain failures. In some embodiments, data stored in the update stream 116 may be temporary, so that after a certain time period (e.g., 24 hours), the stream data will expire and be deleted from the stream.

As shown, in some embodiments, the indexing system may include an indexing engine 120. The indexing engine 120 may be implemented as a combination of software or hardware modules or components, configured to receive update records from the update stream 116, and apply those update records as index updates 128 to an index store 140 maintained by the indexing system. In some embodiments, one or both of the indexing engine 120 and the index store 140 may be external to the data store 110. In some embodiments, the data store 110, indexing engine 120, and index store 140 may be implemented as three distinct computer systems. In some embodiments, the indexing engine 120 may implement a number of update stream consumer 122, which may periodically poll the update stream 116 or be registered to listen for updates in the update stream 116. These consumers 122 may then retrieve the updates from the stream 116 and unpack them for use by the other components in the indexing engine 120, in particular the index updater 126. In some embodiments, each individual storage object 112 may generate a different update stream 116, and each stream will be consumed by a different instance of an update stream consumer 122. In some embodiments, the update stream consumer 122 may consume multiple stream records (e.g., a batch of records) per retrieval. In some embodiments, the update stream consumer 122 may consume stream records on a periodic basis (e.g., once every minute).

As shown, in some embodiments, the indexing engine 120 may maintain a set of indexing rules 124, which may be configurable via an index configuration module or interface 132 in a configuration system 130 for the indexing system 100. In some embodiments, the indexing rules may be used to define the indexes 142 in the index store. For example, an indexing rule may specify different filter criteria or sort criteria for the different indexes 142. In some embodiments, each index 142 may have one indexing rule 124.

As shown, in some embodiments, the indexing engine 120 may implement an index updater 126, which may include the logic to process each update record in the update stream 116, before they are sent as index updates 128 to the index store 140. In some embodiments, the index updater 126 may use the indexing rules 124 to determine, for each update record in the update stream 116, which indexes 142 are impacted by that record. For example, the indexing engine 120 may check the update record against the filter criteria of the different indexes 142. In some cases, an update may cause a data item to satisfy the filter criteria of an index 142, so that the index updater 126 will generate an insertion to that index 142. In some cases, an update may cause a data item to not satisfy the filter criteria, so that the index updater 126 will generate a delete of that item from the index 142. In some cases, an update may change a sort key for the data item in an index 142, so that the index updater 126 will generate an update to the index 142 to change the sorting of the index.

In some embodiments, the index updater 126 may perform additional tasks to generate the updates 128 to the indexes. For example, the index updater 126 may compute certain additional data that are derived from the update records or simply filler data. In some embodiments, the index updater 126 may be capable of computing aggregate values, such as totals or averages, across particular groups of data items, which may be updated as a result of the update records. In some embodiments, the index updater 126 may combine updates from two or more storage objects into a single index, using some type of merge or join logic. In some embodiments, all of these capabilities of the index updater 126 are fully specified in the indexing rules 124, and configurable via the index configuration interface 132.

As shown, the index updater 126 may be used to update indexes 142a-c for a storage object 112 maintained by the index store 140. In some embodiments, the indexes 142a-c may store some of the keys of the data items in the storage object 112. The keys in the indexes 142 may be filtered according to one or more filtering criteria, and/or sorted according to one or more sorting criteria. Thus, these indexes may be used to perform certain queries that include such filtering or sorting criteria to speed up the queries.

In some embodiments, the index store 140 may be implemented using a cluster of compute or storage nodes. The nodes may divide the index memory into shards or partitions, so that index read or write traffic may be handled independently by the different shards or partitions. In some embodiments, new partitions may be added to the cluster, making the index store scalable to larger data sets and higher access demands. In some embodiments, the index store may be scaled dynamically during execution. In some embodiments, the nodes may implement some form of redundancy, so that a failing node in the index store may be quickly replaced by another healthy node. In some embodiments, each partition or shard in the index store may be replicated across a number of nodes, so that the data in each partition or shard is stored on one or more read replicas.

In some embodiments, the index store 140 may be implemented as an in-memory data store, which may be hosted on a cluster of nodes. Thus, the indexes 142a-c may be maintained on one or more nodes of the cluster. In some embodiments, the index store 140 may be implemented such that its memory locations may be directly addressable by clients such as the index updater 126. In some embodiments, the index store 140 may be implemented as a service, so that accesses to the data are performed via a service interface, such as an API. In some embodiments, the index store may be maintained completely in runtime or transitory memory. In some embodiments, the index store may be maintained partly in runtime memory, and partly on persistent or non-transitory memory. For example, the index store 140 may dynamically swap some portion of its in-memory data to disk (or other persistent storage) when space becomes scarce in the runtime memory, based on a heuristic or policy (e.g. last-recently-used (LRU) or first-in-first-out (FIFO), etc.).

In some embodiments, the indexing system 100 may implement an index refresher 150, which may be used to refresh the indexes 142 in the index store 140. As shown, in some embodiments, the refresher 150 may cause the refreshing to occur via touch updates 152 performed on the storage object(s) 112 in the data store 110. When data items in the storage object 112 is updated via the touch updates 152, they may be added to the update stream 116, which is then processed by the indexing engine 120 to update the indexes 142. In some embodiments, the touch updates 152 may update a metadata attribute of the data items that are not generally visible to clients of the data store 110. In some embodiments, the metadata attribute may be an internal version number that is provided for refreshing purposes, which may be updated at little or no cost to the client.

According to the refresher configurations 134, the index refresher 150 may perform the refresh in different manners. In some embodiments, the refresher 150 may perform refreshes when an indexing rule 124 in changed. In some embodiments, the refresher 150 may perform refresher periodically or continually to gradually push updates into the index engine 120 and indexes 142. For example, the refresher 150 may cycle through different partitions or data items at regular time intervals (e.g., once per 5 minutes) to push data items into the indexes. In some embodiments, this refreshing may occur in the background, and automatically pause in response to detected heavy activity in the data store 110, and resume when the data store 110 becomes less active. In some embodiments, the periodic refreshing paused or restarted manually via an explicit user or administrator commands. In some embodiments, the refresh operation may be invoked via a user command.

In some embodiments, the refreshing may perform touch update on all data items in the storage object 112. In some embodiments, the refreshing may be configurable or controllable on a per-index basis. For example, the refreshing operation may be performed so that only certain data items meeting a specific criterion are touched via the touch updates 152. For example, when an indexing rule for an index changes, the refresher may be configured so that only data items that are impacted by the filtering criteria for that index are touched by the touch updates. Depending on the condition under which the refresh operation was launched, different subsets of data items may be touched.

As shown, in some embodiments, the indexing system 100 may include a configuration subsystem or interface 130. The configuration interface 130 may provider a user interface that allows users to create, configure, and otherwise manage particular indexes 142 for storage objects 112. In some embodiments, the configuration interface 130 may be a graphical user interface (GUI). In some embodiments, the configuration interface 130 may be a web-based interface. In some embodiments, the configuration interface 130 may allow a user to directly edit the indexing rules in their text form. In some embodiments, the configuration interface 130 may allow the user to configure the indexing rules and refresher settings via one or more GUI forms. As shown, the configuration interface 130 may allow the user to configure both the index configuration 132 and refresher configurations 134. In some embodiments, the configuration 130 may allow the user to initiate or stop refresh operations, or track the progress of particular refresh operations.

FIGS. 2A to 2F are diagrams illustrating different types of indexes and indexing behavior that may be implemented by example data store indexing systems, according to some embodiments.

Figure 2A:
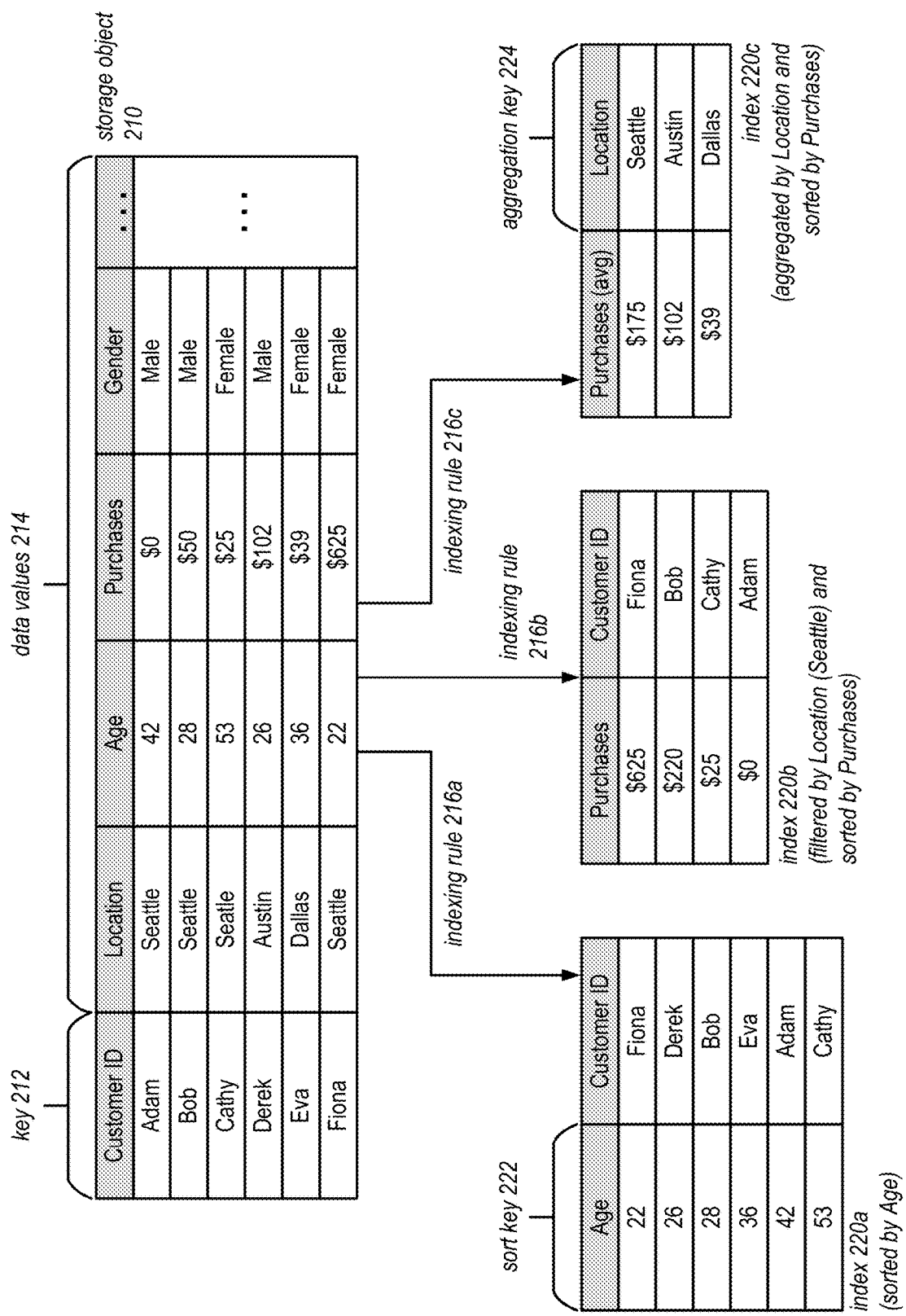
FIGS. 2A to 2F are diagrams illustrating different types of indexes and indexing behavior that may be implemented by example data store indexing systems, according to some embodiments.

FIG. 2A illustrates three indexes 220a-c that are generated for a storage object 210. As shown, the storage object 210 includes a key attribute 212, which may be an identifier attribute (e.g. Customer ID) for the data items in the storage object 210. Each data items may also have one or more data values 214.

As shown, indexes 220a-c are maintained for the storage object 210. These indexes may be populated in the index store (e.g., index store 140) via an indexing engine (e.g., indexing engine 120), as discussed in connection with FIG. 1. As shown, each index 220 has an associated indexing rule 216, which specifies how they are populated from the storage object 210. As discussed, these rules 216 may be used by the indexing engine to consume an update stream from the data store storing the storage object, to apply for example different filtering and/or sorting criteria.

As shown, index 220a stores the keys of the data items in the storage object in a sorted order, here by the Age attribute. Thus, the Age attribute is the sort key 222 of the index. Such an index allows certain types of queries (e.g. range queries based on Age) to be performed more quickly. As new updates are received from the storage object 210, the indexing engine and/or the index store may ensure that all data items in the index are stored in the sorted order according to Age.

As shown, index 220b stores a filtered subset of keys in the storage object (filtered by Location of "Seattle"), and sorted by the Purchases attribute. In this example, the indexing rules 216b may filter in or out updates from the update stream that satisfy the filter criteria for the index. In some cases, the indexing engine may remove data items from the index 220b if an update causes the data item to no longer satisfy the filter criteria. Conversely, the indexing engine may add data items to the index 220b if an update causes the data item to satisfy the filter criteria.

As shown, index 220c stores a set of data items using a key (Location) that is different from the key 212 in the storage object 210. Thus, as may be seen, each item in the index 220c represents a grouping or aggregation of possibly multiple items in the storage object 210, and the Location key in the index may be referred to as the aggregation key 224. Such grouping or aggregation of data items from the storage object may be specified in the indexing rule 216c. Thus, as new updates to the storage object are received, the indexing engine may perform logic to re-compute the average Purchases attribute for the index 220c, and then update the index accordingly.

Figure 2B:
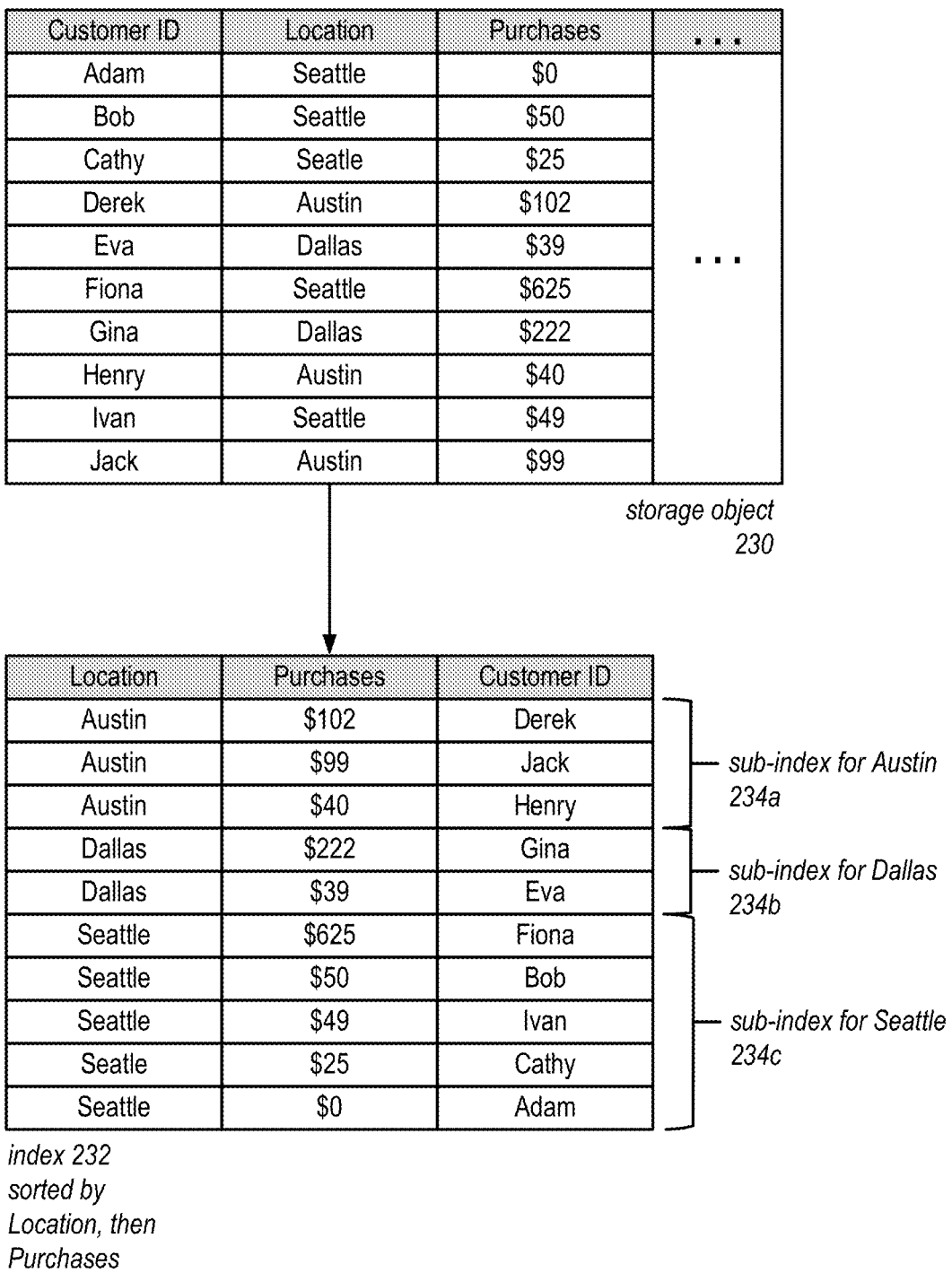

FIG. 2B illustrates an example index that uses multiple keys for the index. In this example, index 232 generated for storage object 230 employs two different sort keys, Location and Purchases. The index 232 is sorted first on the Location key and then on the Purchases key. In some embodiments, an index such as index 232 may be stored in the index store or presented by the index store as multiple sub-indexes. For example, as shown, three sub-indexes 234a-c are configured on top of the index 232, one for each Location value. Thus, these three sub-indexes may be used for queries for the three different locations, for example. In some embodiments, multiple layers of indexes may be built on top of each other by the indexing engine. In some embodiments, a single index may employ multiple sort keys, filtering keys, and/or aggregation keys, which may all be specified using the indexing rules for the index.

Figure 2C:
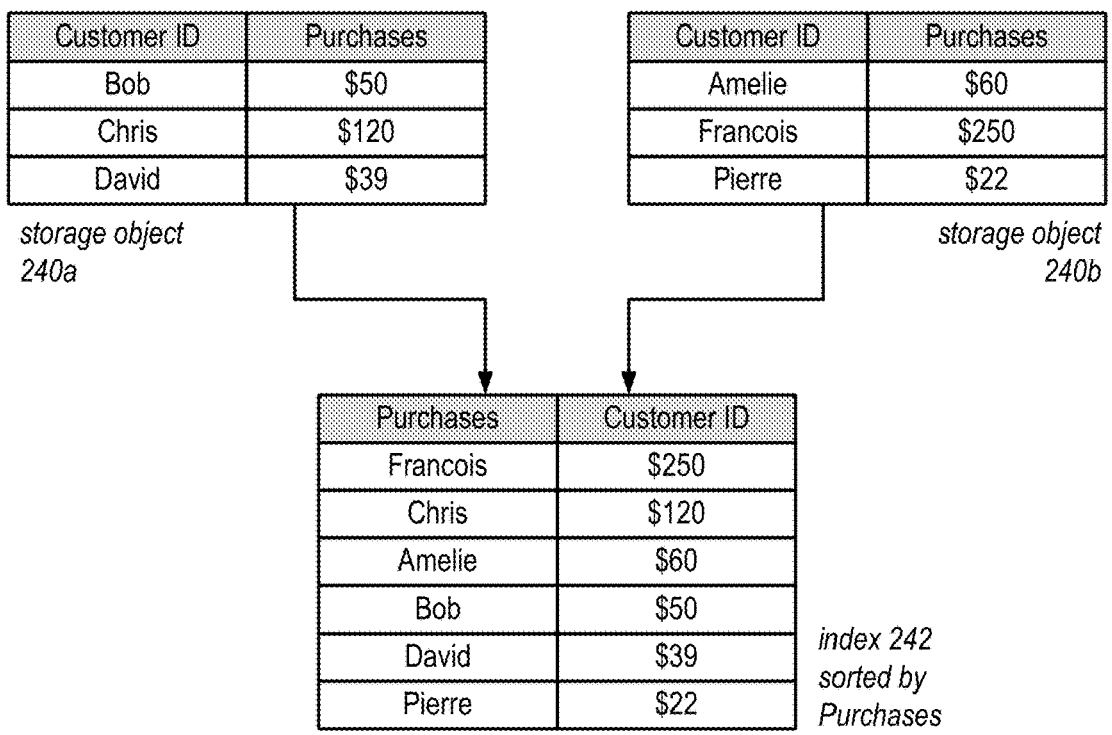
Figure 2D:
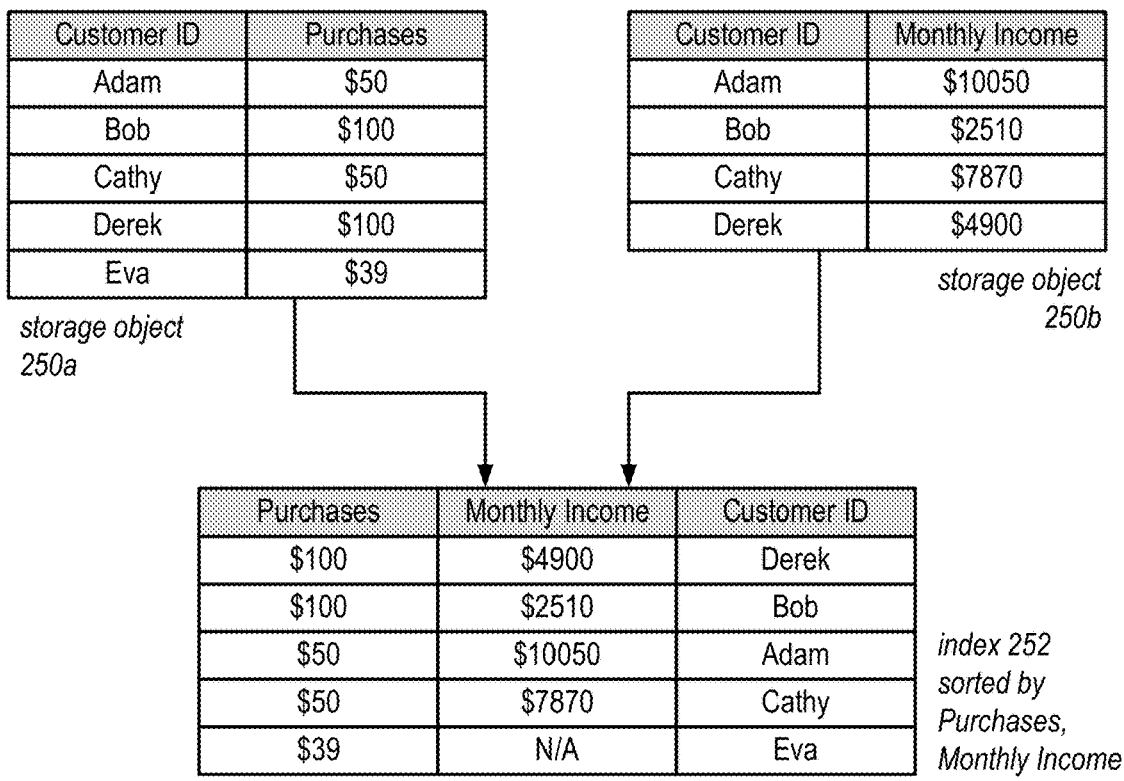

FIGS. 2C and 2D illustrate two example indexes 242 and 252 that are generated from two different storage objects. In FIG. 2C, the index 242 is generated from the data in storage objects 240a and 240b. In this case, the data items in the two storage objects are simply placed as respective data items into the index 242. The data items from the two storage objects are then sorted according to a common sort key Purchases. In practice, the two storage objects may have other different data attributes. These other attributes may not be projected into the index 242. In this example, the index 242 may be populated via two separate indexing rules, one for each storage object. In some embodiments, the index may be populated using a single rule specifying two different source storage objects.

In FIG. 2D, the index 252 is generated from the data in storage objects 250a and 250b. In this case, the data items in the two storage objects are joined to form one or more merged items in the index 252. As shown, in this example, the data items in the two storage objects are joined based on the Customer ID attribute. This joining may be specified in an indexing rule that specify both storage objects as sources, and a join parameter that specifies how the two sources objects are joined. As may be appreciated, different types of joining may be possible. For example, in some cases, the join parameter may specify a one-to-many or many-to-many join relationship.

Figure 2E:
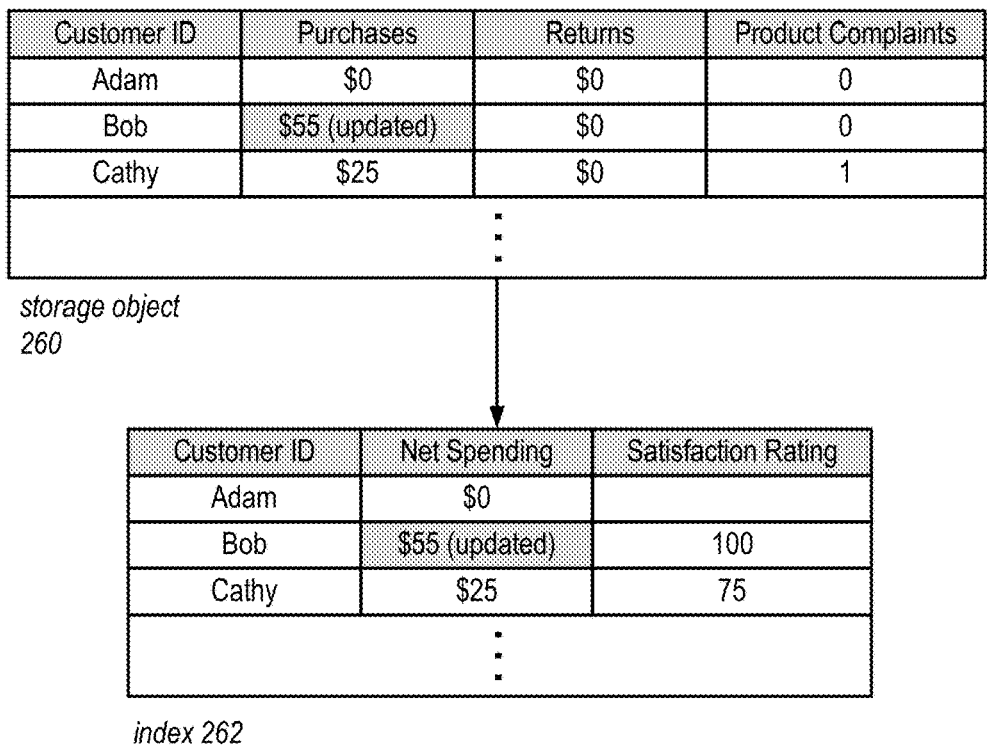
Figure 2F:
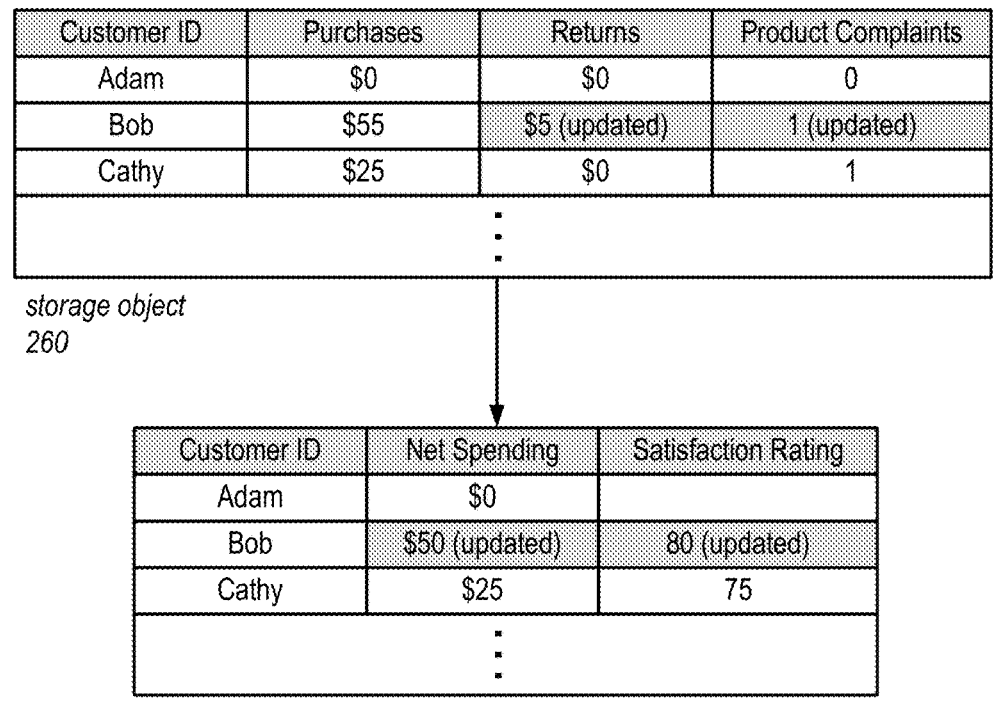

FIGS. 2E and 2F illustrate the behavior of an index 262 that is configured to handle related partial updates to a storage object 260. In some embodiments, a partial update may update only a portion (e.g., some subset of attributes) in a data item in the storage object. In some embodiments, different indexing rules may be specified to perform different functions depending on the attribute(s) that were updated. In some embodiments, a group of several partial updates may be joined in a manner so that the end result of an earlier partial update in the group will be used by the indexing engine to apply a later partial update to the index.

As shown, FIG. 2E shows that the Purchase attribute of the data item Bob is updated to $55, in a partial update. In some embodiments, different partial updates may come from different clients of the data store. For example, in this example, the Purchases attribute may be updated by a purchase subsystem in an e-commerce system, while other attributes such as Returns and Product complaints may be updated from a separate customer service subsystem. As shown, in response to the Purchase partial update, the index 262 updates the Net Spending attribute, which may be a computed value calculated based on an indexing rule for the index 262.

As shown, in FIG. 2F, a second partial update is made to the storage object 260, where the Returns and Product Complaints attributes are updated, reflecting a return of an item for $5, and the recording of a new product complaint. In response to the second partial update, the indexing engine may update the index 262 to reduce the Net Spending attribute by $5 to $50, and also recalculate a Satisfaction Rating attribute for the data item Bob, so that the rating is changed from 100 to 80.

In this illustrated update to the index 262, the indexing engine may apply an indexing rule that relies on the results of earlier partial updates, for example, the first update to the Purchase attribute in FIG. 2E. In some embodiments, a group of attributes may be collectively designated in a transactional group, so that they may be treated as a single transaction by the indexing engine. In some embodiments, the indexing engine may maintain some state with respect to the transaction group, so that results from earlier partial updates in the group are maintained, for a period of time, and be used to process later partial updates in the same group. For example, in this example, the result of the earlier partial update of Purchase may be maintained and used to compute the Return attribute for the second partial update. In addition, the indexing rules may specify a separate computation that determines the Satisfaction Rating based on modifications of the Product Complaints attribute. In some embodiments, the indexing engine may not use any transaction groupings, but simply cache recent updates to individual keys for a period of time to be used for processing subsequent partial updates. In some embodiments, instead of or in addition to maintaining additional state for partial update within the indexing engine, the indexing engine may implement logic to read data from the index 262 in the index store in order to perform the processing.

Figure 3:
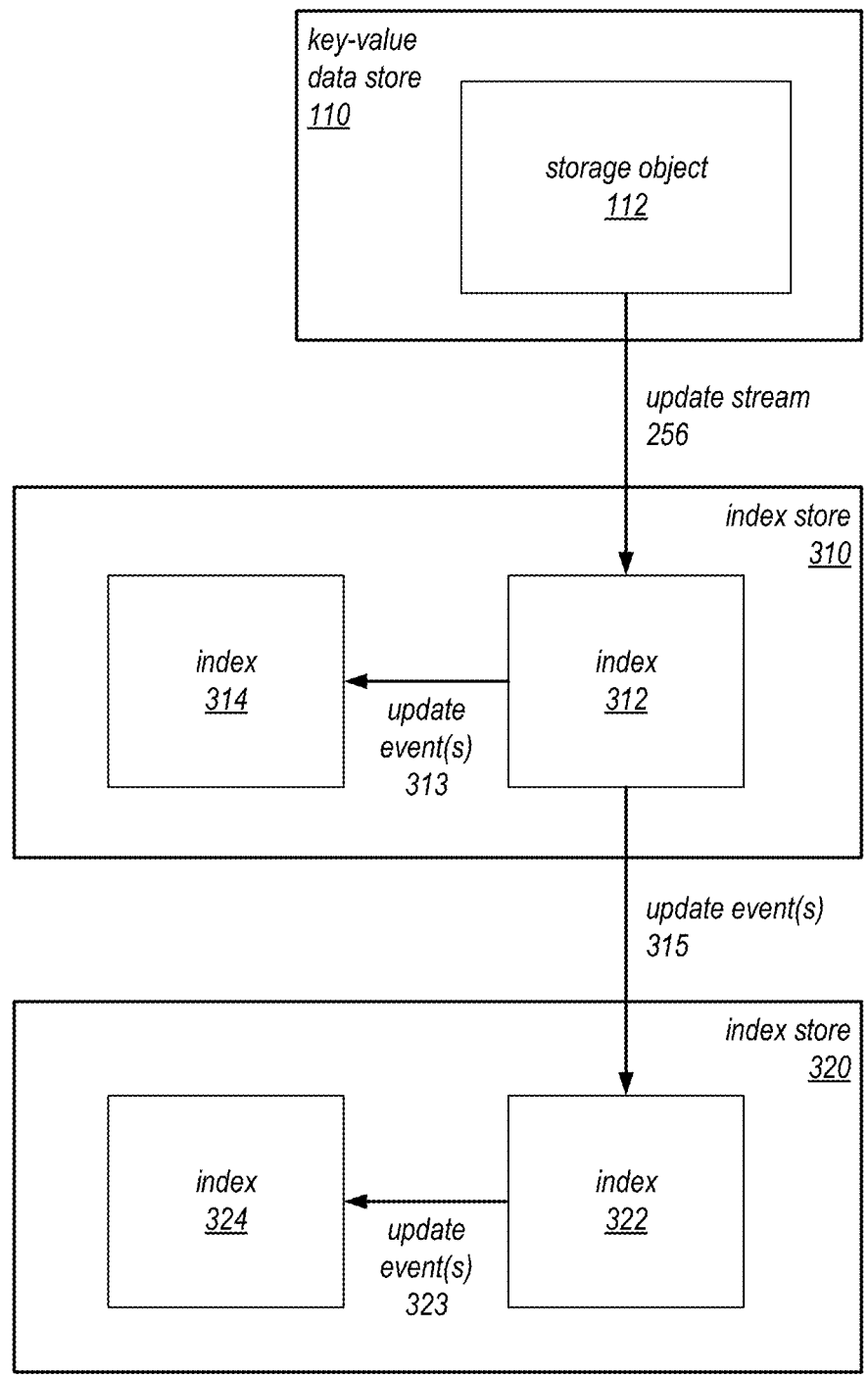
FIG. 3 illustrate an example chaining of different indexes in an example data store indexing system, according to some embodiments.

FIG. 3 illustrate an example chaining of different indexes in an example data store indexing system, according to some embodiments.

As shown, in some embodiments, one index may be updated based on updates to another index. Thus, for example, index 314 may be updated in response to updates to index 312, and index 324 may be updated in response to updates to index 322, as shown. In some embodiments, this updating may be performed via the indexing engine 120, which may implement handlers that respond to update events in one index and perform an update in response to the update event in another index. In some embodiments, the behavior of such handlers may be specified via the indexing rules associated with the source or target index, and update propagation schemes may be configured via the configuration interface 130. The chaining of indexes in this manner may useful, for example, to implement indexing logic in stages, where earlier indexes in the chain may be shared by multiple downstream indexes. For example, in some embodiments, a top-level "universe" index may be maintained for a large portion of the data in the storage object 112. The universe index may contain, for example, all of the data attributes that are needed for downstream indexes that are chained from the universe index, which may implement different client-specific indexing logic to present different client-specific views. Depending on the embodiment, the chaining may be implemented via the indexing engine between indexes within a single index store, or across different index stores, as illustrated by the updates 315 from index 312 to index 322.

Depending on the embodiment, the chaining may be implemented using different mechanisms. In some embodiments, the chaining may be implemented using a similar mechanism to that between the storage object 112 and the receiving index. That is, an update stream may be generated by the source index, which may be processed in accordance with the indexing rules of the receiving index and then applied to the receiving index. In some embodiments, a different mechanism may be employed. For example, the receiving index may simply register as a listener to the source index to listen for all of its updates. The processing logic of such chaining may be specified in the indexing rules, which may all be configurable, as discussed.

FIG. 4 illustrates examples indexing rules for different indexes in an example data store indexing system, according to some embodiments. In some embodiments, as shown, the indexing rules 410 may be stored in a configuration file. In some embodiments, the indexing rules may be stored in a more sophisticated configuration repository, such as a database. In some embodiments, the indexing rules 410 may be stored in a human readable format, so that they can be directly edited by a user or an administrator in text form.

As shown, in some embodiments, the indexing rules 410 may be organized into multiple index groups. For example, the indexes in a single index group may be dependent on a common set of storage objects. In some embodiments, different index groups may be created for different users or clients, so that the index store may be used by multiple users. In the illustrated example, the index group is defined in the group header 412. The index group is hosted in an index store cluster named "CLUSTER_1," and all indexes in the group are generated from a storage object (or "keyspace") named "Users." As shown, the index group 410 includes three indexing rules 414, 416, and 418, which in this example corresponds to three separate indexes that are generated for the storage object Users.

As shown, indexing rule 414 defines an index called "users_by_age," which uses the attribute Customer_ID as the index key. The index sorts data items from Users by the Age attribute, and does not filter out any data items from Users. Thus, the resulting index may look like index 220a, as discussed in connection with FIG. 2A.

As shown, indexing rule 416 defines an index sea_users_by_purchases, which also uses Customer_ID as the index key. This index 416 sorts the data items by the Purchases attribute in descending order. In addition, the index filters the data items based on the criteria that the Location attribute is "Seattle." Thus, the resulting index from this rule may look like index 220b, as discussed in connection with FIG. 2A.

As shown, indexing rule 418 defines an index locations_by_purchases, which uses a the Location attribute as the index key. Thus, the indexing engine may perform some form of aggregation on the data items in the storage object Users to populate this index. As shown, the indexing rule 418 specifies an aggregation function for the sort key. The aggregation function simply computes the average of the Purchases of the data items in each Location group. The indexing rule then specifies a filtering criterion to limit the locations to one of "Seattle," "Austin," or "Dallas." Thus, the resulting index from this rule may look like index 220c, as discussed in connection with FIG. 2A.

A person of ordinary skill in the art would understand that the rules shown in this example are merely exemplary. Details such as the syntax and formatting of the indexing rules may vary from embodiment to embodiment. For example, in some embodiments, the rules may be stored in an XML, format. In some embodiments, the rules may be stored in a binary format. In some embodiments, the rules may allow complex expressions that include math, string, or Boolean operators, etc. As discussed, in some embodiments, the ruled may specify a manner in which two or more tables are joined, or a manner in which new data attributes are derived from the attributes of the storage object. In some embodiments, the rules may be expressed as a query string, for example written in the Structured Query Language (SQL). All of these variations may be employed within the data store indexing system of this disclosure, without departing from the spirit of the inventive concepts disclosed herein.

Figure 5:
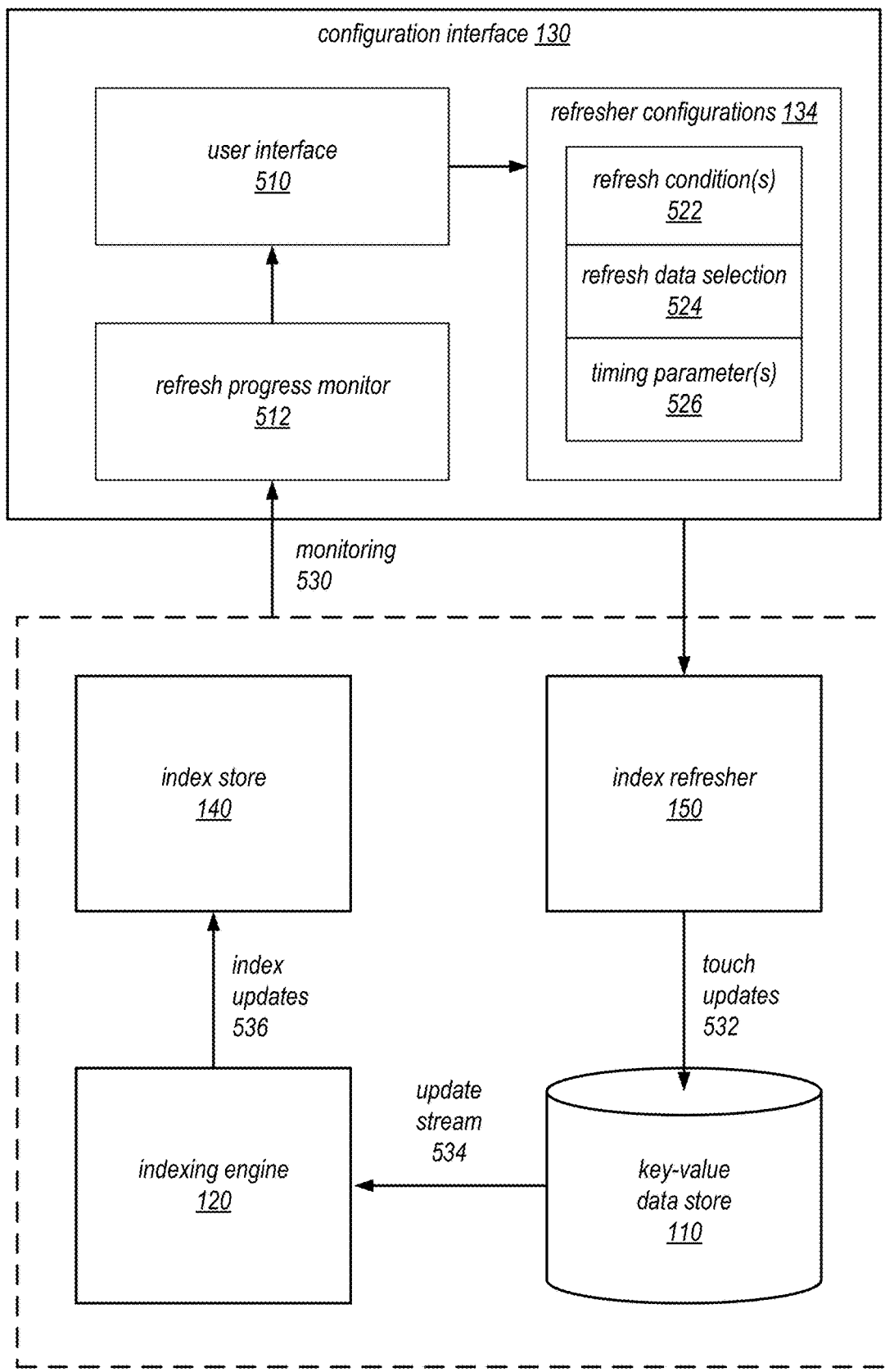
FIG. 5 illustrates example operations of index refresher that is used to refresh indexes from the underlying data store, according to some embodiments.

FIG. 5 illustrates example operations of index refresher that is used to refresh indexes from the underlying data store, according to some embodiments. As discussed in connection with FIG. 1, in some embodiments, the index refresher 150 perform touch updates 532 to the key-value data store 110, so that touch data items are placed in the update stream 534. The update stream 534 may be processed by the index engine 120 via the indexing rules, and then applied 536 to the indexes in the index store 140.

In some embodiments, various aspects of the refresh process are controlled via the configuration interface 130. For example, the configuration interface 130 may maintain a repository of refresher configuration 134 that dictates how refresh operations or processes are performed in the indexing system. The refresher configuration 134 may be maintained in various forms, such as a set of configuration files, a database, or some other form of storage. In some embodiments, the refresher configurations 134 may be viewed and updated via a user interface 510, which may be an API, an interactive user interface such as a GUI, a simple text editor, a command line interface, or some other type of interface.

In some embodiments, the refresher configurations 134 may specify refresh parameters for all indexes in the index store. In some embodiments, the refresh parameters may apply to individual indexes or subsets of indexes in the index store. In some embodiments, the refresher configurations 134 may include specifications on refresh conditions 522, under which a refresh operation is launched for one or more indexes in the index store. In some embodiments, a refresh operation may be performed or initiated when an indexing rule is changed. In some embodiments, a refresh operation may be performed on an ongoing basis, according to a set schedule (e.g., once an hour). The ongoing refresh process may execute in the background, and temporarily pause when the data store 110 is experiencing heavy load. In some embodiments, a refresh operation may be performed to catch up the indexes to the state of the storage object, after a down period when the key-value data store, index store, update stream, or index engine was stopped.

In some embodiments, the refresher configurations 134 may include specifications on refresh data selection 524, which specifies what data items in the storage object are touched during the refresh operation. In some embodiments, the refresh operation may simply touch all data items in the storage object, so that all of the indexes in the index store are properly updated. In some embodiments, to limit the amount of traffic that flows to the indexing engine, the refresh operation may only touch a subset of the data items in the indexing engine. For example, where the refresh is performed due to an interruption in the update stream or the indexing engine, the touch update may be limited to only those items that have changed since the point of the interruption. Such items may be determined from a query of their update timestamps. In some embodiments, the data items may be determined based on the metadata attribute of the items, which may be a flag that is set by an update and then reset by the touch update. In some embodiments, where the refresh is performed due to an indexing rule change, the touch update may be limited to only those items that are impacted by the rule change. For example, the refresher 150 may be configured to first determine a delta of data items between the old and the new filtering criteria in the changed indexing rule, and only those items that fall within the delta are touched during the refresh.

In some embodiments, the refresher configurations 134 may include specifications on timing parameters 526, which specifies various parameters that impacts the speed of the refresh operation. As may be appreciated, in some cases, the storage object may contain a larger number of data items, and a refresh operation cannot be completed immediately. Thus, the timing parameters 526 may govern various aspects that impact the speed of the refresh operation. For example, in some embodiments, the refresh operation may touch partitions of groups of data items at regular intervals. The length of these intervals may be configurable via the timing parameters. In some embodiments, the timing parameters may specify a user requirement that the refresh operations must completed within a certain timeframe. In some embodiments, timing parameters may specify conditions under which the refresh operation will slow down, pause, or speed up, based on for example the load of the data store or the requirements of the user to keep the indexes up to date. Thus, in some embodiments, behavior of the refresh operation may change dynamically based on various conditions in the indexing system.

As shown, in some embodiments, the configuration interface or subsystem 130 may implement a refresh progress monitor 512, which may be used to monitor 530 the progress of one or more refresh operations pending for the index store. For example, in some embodiments, each actor in the refresh operation (e.g., the refresher 150, data store 110, indexing engine 120, etc.) may implement an agent that can report back to the refresh progress monitor 512. In some embodiments, the refresh progress monitor 512 may periodically poll or query the state of the refresh operations on these components. Accordingly, the refresh progress monitor 512 may obtain information regarding the progress of the pending refresh operations (e.g., what percentage of relevant data items have been touched, what percentage have been consumed from the update stream repositories, what percentage have been applied to the index store via the indexing engine, etc.). In some embodiments, the refresh progress monitor 512 may also track an ongoing refresh operation that repeats indefinitely, indicating for example which data items have been recently touched and when.

In some embodiments, the progress information gathered by the refresh progress monitor 512 may be made available to the user interface 510 of the configuration interface. Thus, a user or administrator may see, via the user interface, the current progress of all of the refresh operations in the indexing system. This progress information allows the user to determine how up-to-date a particular index is. In some embodiments, the user interface 510 may allow the user or administrator to start, pause, resume, or cancel refresh operations. In some embodiments, the user interface 510 may allow the user or administrator to adjust various aspects of a refresh operation, for example to adjust its speed, completion time, or priority level, etc.

Figure 6:
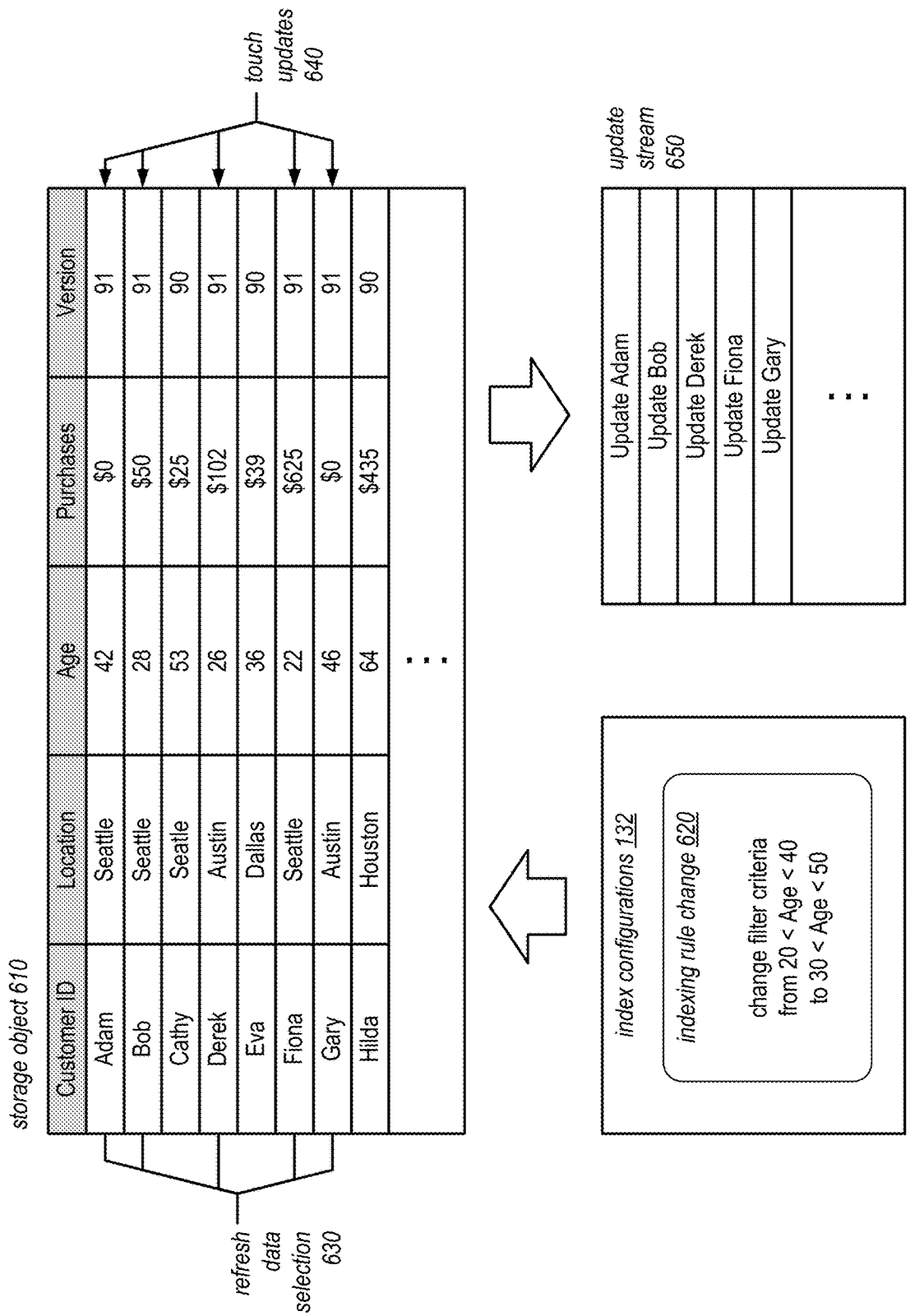
FIG. 6 illustrate an example touch update operation that may be used to perform a refresh of an index in a data store indexing system, according to some embodiments.

FIG. 6 illustrate an example touch update operation that may be used to perform a refresh of an index in a data store indexing system, according to some embodiments. The touch update operation may be used, for example, by an index refresher such as index refresher 150 to refresh indexes in an index store, as discussed in connection with FIG. 5.

As shown, in this example, the refresh operation may be caused by an index rule change 620. However, as discussed, the refresh operation may be launched under a number of different conditions, depending on the embodiment and the configurations of the indexing system. In this example, the indexing rule change 620 entails a change of a filter criterion where the filter range of Age is changed from a range of 20 to 40 to a new range of 30 to 50. As shown, the indexing rule change 620 may be performed via the index configuration interface 132, as discussed in connection with FIG. 1.

In some embodiments, this change 620 in the indexing rules may cause the index refresher 150 to perform touch update on a set of data items in the storage object 610 (here a table), which in turn causes the touched items to be placed in the update stream 650. In some embodiments, upon the rule change, contents of the index associated with the rule may be completely flushed and repopulated from the storage object. In some embodiments, the entire contents of the storage object 610 may be touched, so that every item in the storage object is re-evaluated with respect to the indexing rules to repopulate the index. However, in some embodiments, to reduce the amount of traffic in the update stream and reduce the work of the indexing engine, the index may not be flushed completely (or at all), and only a subset of the items in the storage object 510 may be touched.

For example, in some embodiments, a refresh data selection 630 may be determined, based on the index rule change, so that only the selection 630 of items will be touched to refresh the index. The precise logic that determines the selection 630 may be configurable via the refresh configurations 134 of the indexing system. For example, in some embodiments, a delta may be determined based on the new filter criteria and the old filter criteria of an index, and the only items falling within the delta a touched. In this example, the index refresher (or some other component) may determine that the delta comprises data items that are within the range of 20 to 30 (which will be deleted from the index) and the range of 40 to 50 (which will be added to the index). The range of items from 30 to 40 need not be changed based on the rule change. Accordingly, as shown, only items within the ranges 20 to 30 and 40 to 50 fall within the refresh data selection 630, and are touched with touch operations 640.

In some embodiments, the touch update operations 640 may update a metadata attribute of the storage object 610, here a version number. In some embodiments, the metadata attribute may be an attribute that is not normally used or seen by the client. For example, the client may not be provided with the metadata attribute via routine queries. In some embodiments, updates to the metadata attribute may be performed at no cost to the client. In some embodiments, the metadata attribute may be implemented a monotonically increasing number or a timestamp. In some embodiments, the metadata attribute may a flag that is set when a data item is updated, and reset when the data item is touched via a touch update. In this manner, the metadata attribute itself may be used to determine the refresh data selection 630, by indicating whether a particular data item has been pushed to the indexing engine after a last update.

As shown, the touched items in this example are then placed in the update stream 650 to be processed by the indexing engine and ultimately applied to the indexes. This refresh processes may occur in addition to the normal updates to the storage object 610. Because the touch updates 640 only modify the metadata attribute of the items, repeated appearances of a data item in the update stream 650 will not cause any errors in the index. In some embodiments, the refresh process may occur in the background, and be configured so that it yields to client-driven traffic on the storage objects. However, all of the needed touch updates 640 will eventually be performed, so that the indexes will be gradually brought up-to-date. As discussed, in some embodiments, the speed of this refresh process may be configurable via the refresher configurations 134.

Figure 7A:
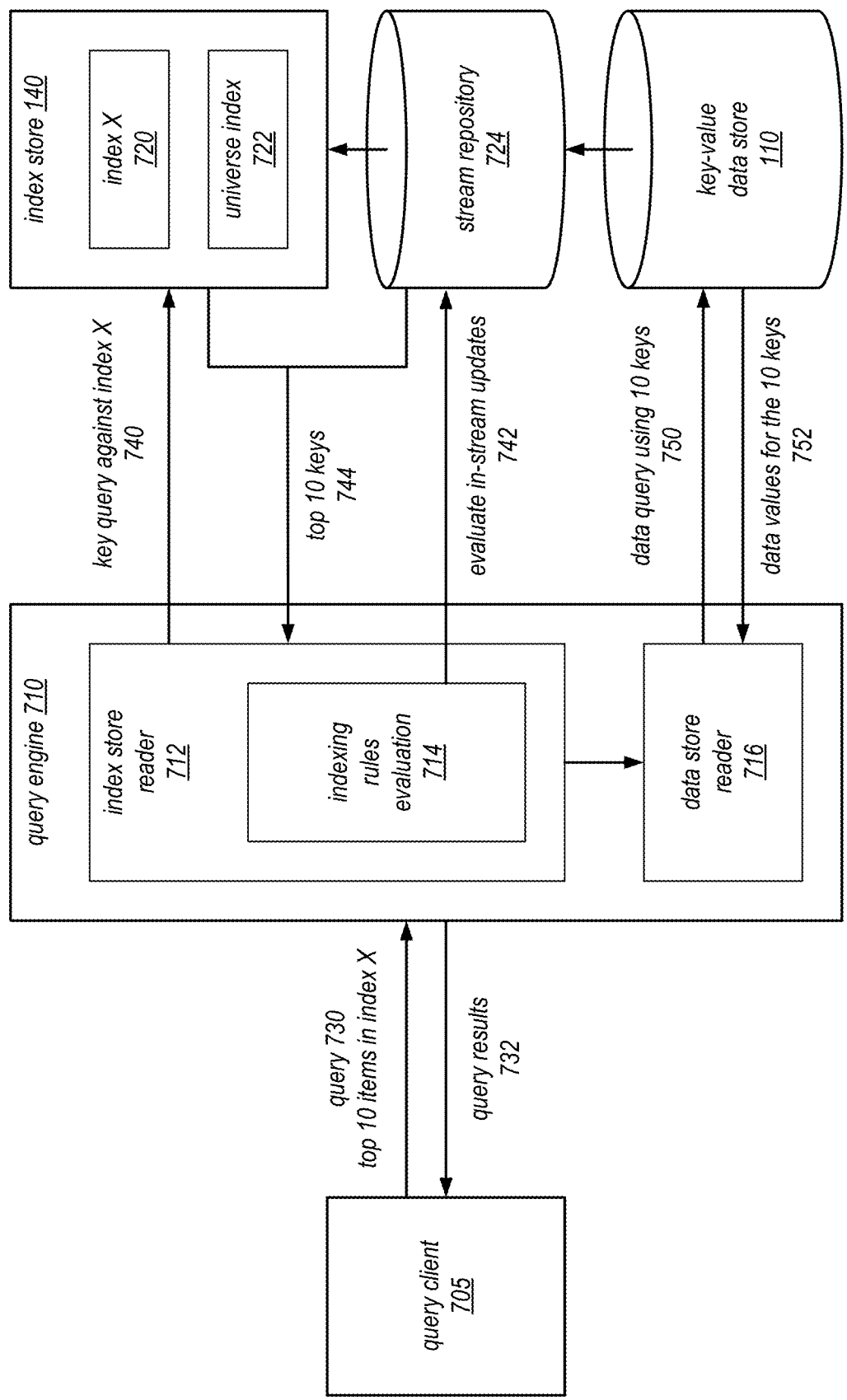
FIGS. 7A and 7B illustrate an example query engine that uses the indexes in the data store indexing system to perform queries, according to some embodiments.
Figure 7B:
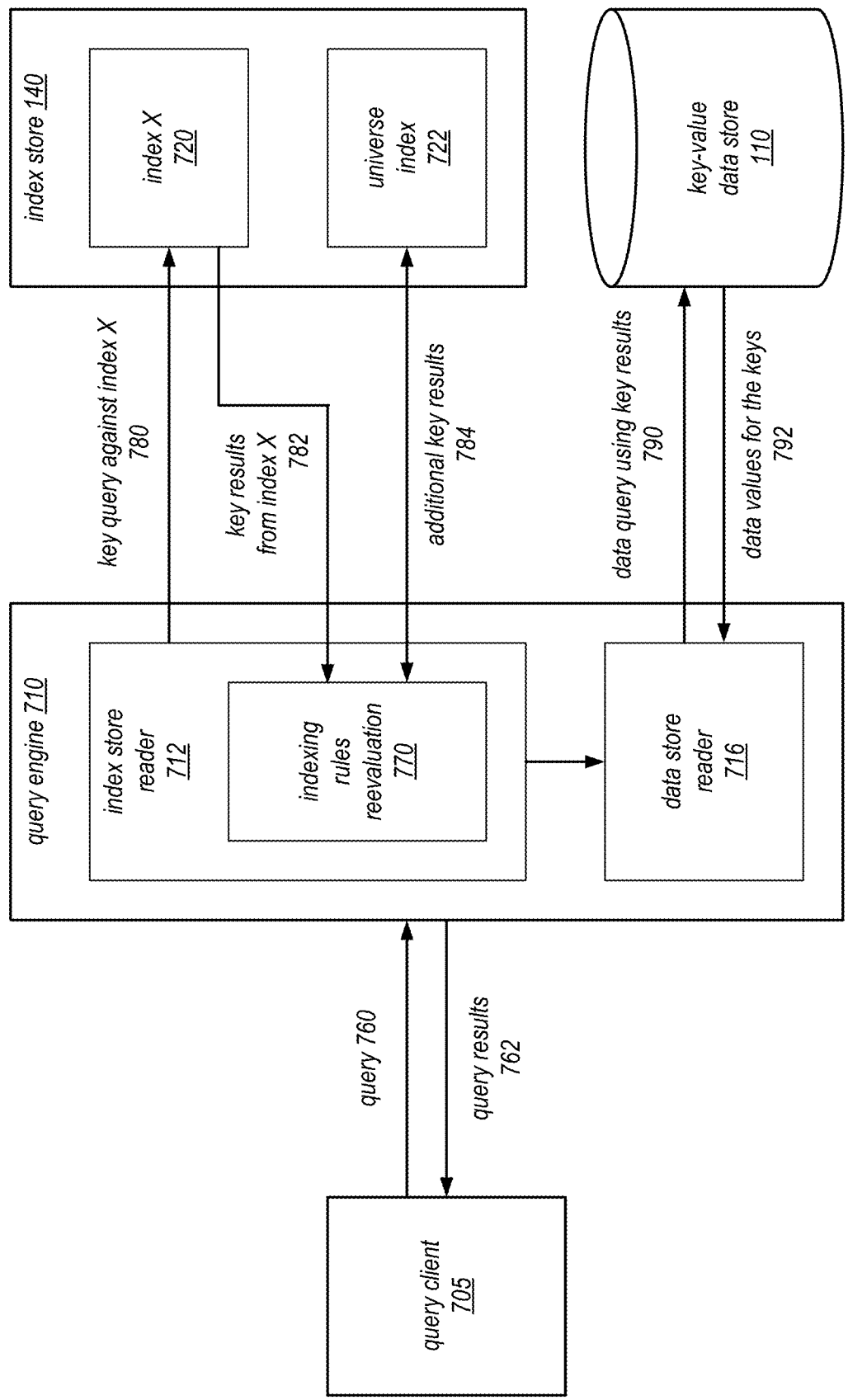

FIGS. 7A and 7B illustrate an example query engine that uses the indexes in the data store indexing system to perform queries, according to some embodiments. As discussed, the indexes maintained by the indexing system may be used to speed up queries against the storage objects in the data store. Thus, in some embodiments, the illustrated query engine 710 may be adapted to take advantage of the indexes stored in the index store 140 to perform the queries.

As shown in FIG. 7A, the query process may be initiated by a query client 705, which sends a query 730 to the query engine 710. Depending on the embodiment, the query engine 710 may provide different types of query interfaces to clients. In some embodiments, the query engine 710 may provide a call interface such as an API or web service interface to receive client queries, which may be formatted in a format that can be parsed by the call interface (e.g., JSON format). In some embodiments, the query interface may support or be implemented as part of an object-oriented access interface that allows clients to read and write data as objects. In some embodiments, the query engine 710 may be configured to respond to a particular query protocol, or a particular type of query language (e.g., SQL queries). In some embodiments, the queries may be received via interactive user interfaces.

In some embodiments, the query interface of the query engine 710 may support particular types of queries. For example, queries to the query interface may specify the identifier of a particular storage object in the indexing system. The identifier may be specified, for example, using the index store name (or cluster name) and the "keyspace" name of the storage object, as shown for example in the index rule group header 412 in FIG. 4. Thus, in some embodiments, the query engine 710 may determine which index to use to perform the query, based on the storage object and the query criteria. In some embodiments, the query may explicitly specify the index to use to perform the query.

In some embodiments, the query interface may accept GET queries that specify a single key of a data item in the storage object. In some embodiments, the query interface may accept a GET BATCH query that specifies a list of keys in the storage object. In some embodiments, the list of keys may contain key expressions with wildcards, which may be supported by the query engine. In some embodiments, the query interface may accept a COUNT query that returns a count of a particular key or attribute. In some embodiments, the query interface may accept a BATCH COUNT that accepts a count associated with a list of keys or attributes. In some embodiments, the query interface may accept a range query that returns a set data items satisfying a range criterion.

In some embodiments, the query interface may accept queries with query criteria, including for example operators such as and, or, equal to, greater than, less than, etc. In some embodiments, the query interface may accept queries that include a sort criterion that specifies how returned data items should be sorted. In some embodiments, the query interface may accept queries that include a page size, which indicates the number of data items that are received in a "page" of results returned from the query. The query may return a result object (e.g. a pagination token or identifier), which may be used to iterate through multiple pages of results. In some embodiments, the portions of the queries may be performed by the query engine 710, while other portioned may be "pushed down" to be executed by the index store 140 or the data store 110. For example, the query engine may perform the pagination functionality, while the underlying data stores may perform the filtering or sorting functionality.

In this example, as shown, the query 730 asks for the top 10 items in a particular index, index X. The query engine 710 may receive and parse the query, and then perform a two-step lookup process, according to some embodiments. In the first lookup, an index store reader 712 may be used to perform a key query 740 to find the top 10 keys in index X 720. The key query 740 may be performed via the query interface of the index store 140. In response, the index store 140 may return 744 the top 10 keys back to the query engine. Then, in a second lookup, a data store reader 716 may be used to perform a data query 750 using the top 10 keys in the key-value data store 110. In some embodiments, the top 10 keys may be the identifier keys used in the storage object in question. In response, the data store 110 may return 752 data values for the 10 keys back to the query engine 710, which then combines the keys and their data values and returns 732 them as query results to the query client 705.

Thus, using this approach, the data values of the keys may be stored in a separate location from the indexes themselves, which reduces memory usage in the index store 140. In some embodiments, the data query 750 may be performed much more quickly using the keys, as opposed doing a scan of the storage object in the data store 110 without any indexing. Thus, use of the index X 720 may dramatically improve the performance of the query.

In some embodiments, the storage object (or a portion of the storage object) may actually be maintained in the index store 140. For example, the index store may maintain a "universe" index 722, which may include all data items keys and all data values that are relevant to the other indexes in the index store. The universe index 722 may be populated and refreshed via the update stream, in similar fashion with the other indexes in the index store. In such embodiments, the two-step lookup may be performed completely using the index store 140, without having to access the data store 110. Thus, where the universe index is sufficiently small to fit inside the index store 140, maintaining the universe index 722 allows the queries to be performed even faster.

In some embodiments, use of the universe index 722 to obtain data values may be optional, and configurable via a configuration parameter of the query interface. In some embodiments, use of the universe index represents a tradeoff between speed of query performance and the space needed to store the data in the index store. In some embodiments, the space in the index store is relatively expensive compared to the data store, and so an administrator of a system may use the configuration interface to select whether a universe index should be used for queries, and if so, what data should be maintained in the universe index. In some embodiments, highly queried-for data values (or data items) may be maintained in the universe index, while infrequently queried data values (or data items) may be left in the data store. In some embodiments, the scope of the universe index may be defined by a set of indexing rules for that index, in a similar fashion as for the other indexes. In some embodiments, the universe index one or more other indexes in the index store may be chained so that they are updated in response to an update of the universe index.

In some embodiments, the query engine 710 may implement an indexing rules evaluation module or component 714. This evaluator 714 may be used to perform an evaluation 742 of in-stream items that are stored in the stream repository 724, waiting to be processed by the indexing engine. In some embodiments, because these updates in the stream repository have not yet been processed, the index in question, such as index X 720, may not reflect the most up-to-date state with respect to the storage object. Thus, during a query, when there are updates in the stream repository 724, the index rules evaluator 714 may evaluated the waiting updates using the indexing rules associated with index X 720, so that the query can obtain completely accurate results. The results obtained from the stream repository 724 may be combined with the results from index X to produce the top 10 keys 744, as shown. In some embodiments, index X 720 may be updated as a result of the evaluation, so that the query causes the index to become up-to-date.

In some embodiments, instead of directing the key query 740 to index X 720, the query engine 710 may direct the query to the universe index 722, which contains a superset of the keys in index X 720. The query engine 710 may obtain all the keys from the universe index 722 and then evaluate the indexing rules to determine the top 10 keys on its own. Alternatively, the query engine 710 may perform the key query 740 against the universe index using the filter and sort criteria specified in the indexing rule for index X. In either way, the query is performed using an evaluation of the indexing rule of index X, rather than using index X directly. Such an approach may be used in situations where, for example, index X is out-of-date (e.g., due to a recent rule change). In some embodiments, after results for the key query 740 are received, the query engine 710 may cause index X 720 to be updated with the results of the key query 740.

FIG. 7B illustrates a reevaluation functionality of the query engine 710. As shown, in some embodiments, the query engine 710 may implement an indexing rules re-evaluator 770. Unlike the indexing rules evaluator 714 discussed previously, the indexing rules re-evaluator 770 may apply the indexing rules to reevaluate keys that are fetched from the index 720. Based on the reevaluation, some fetched keys may be determined to no longer satisfy the indexing rules of the index 720, and may be dropped or removed from the key results 782. This situation may occur for example where the subject index 720 is out-of-date. For example, the index X may have just undergone rule change, or been manually flushed via a user command, etc. In some embodiments, the data store indexing system may implement various other monitoring techniques (e.g., monitoring contents of the stream repository or the storage object) to determine that index 720 is out-of-date. When such conditions are present, the query engine may determine to reevaluate results fetched from the out-of-date index and "fix" the key results at query time, so as to ensure that returned key results only contain keys that satisfy the indexing rules. In some embodiments, the indexing engine may fetch additional results to fully populate a results page or a requested number of results specified by the query, to replace the keys that were removed due to the reevaluation of the indexing rules.

In some embodiments, the indexing rules reevaluation module 770 may perform an additional step to fetch keys from another index, such as the universe index 722, based on the indexing rules. As may be understood, in some cases where the indexing rules for index 720 have changed, certain keys that should be present in the index 720 may still be missing. However, in some embodiments, the universe index 722 may not be subject to the changing filtering criteria of the index 720, and so its contents will include all keys that can satisfy the key query 780. Thus, in some embodiments, instead of or in addition to the query 780 to the index 720, another query 784 may be performed on the universal index 722 using the indexing rules of index 720 to obtain an up-to-date set of keys. In some embodiments, whenever the index 720 is indicated to be out-of-date, the universe index 722 may be used to perform key queries directed to that index 720, using the indexing rules of the index 720.

After the correct keys are obtained via the key query (e.g., queries 780 and/or 784), the query process proceeds as discussed in FIG. 7A. Again, data values associated with the resulting keys are obtained via a data query 790. Again, this may be performed using either an index store structure such as the universe index 722, or the storage object in the data store 110. The data values and keys may then be combined by the query engine 710 and returned to the client as query results 762, according to the query interface of the query engine 710.

Figure 8:
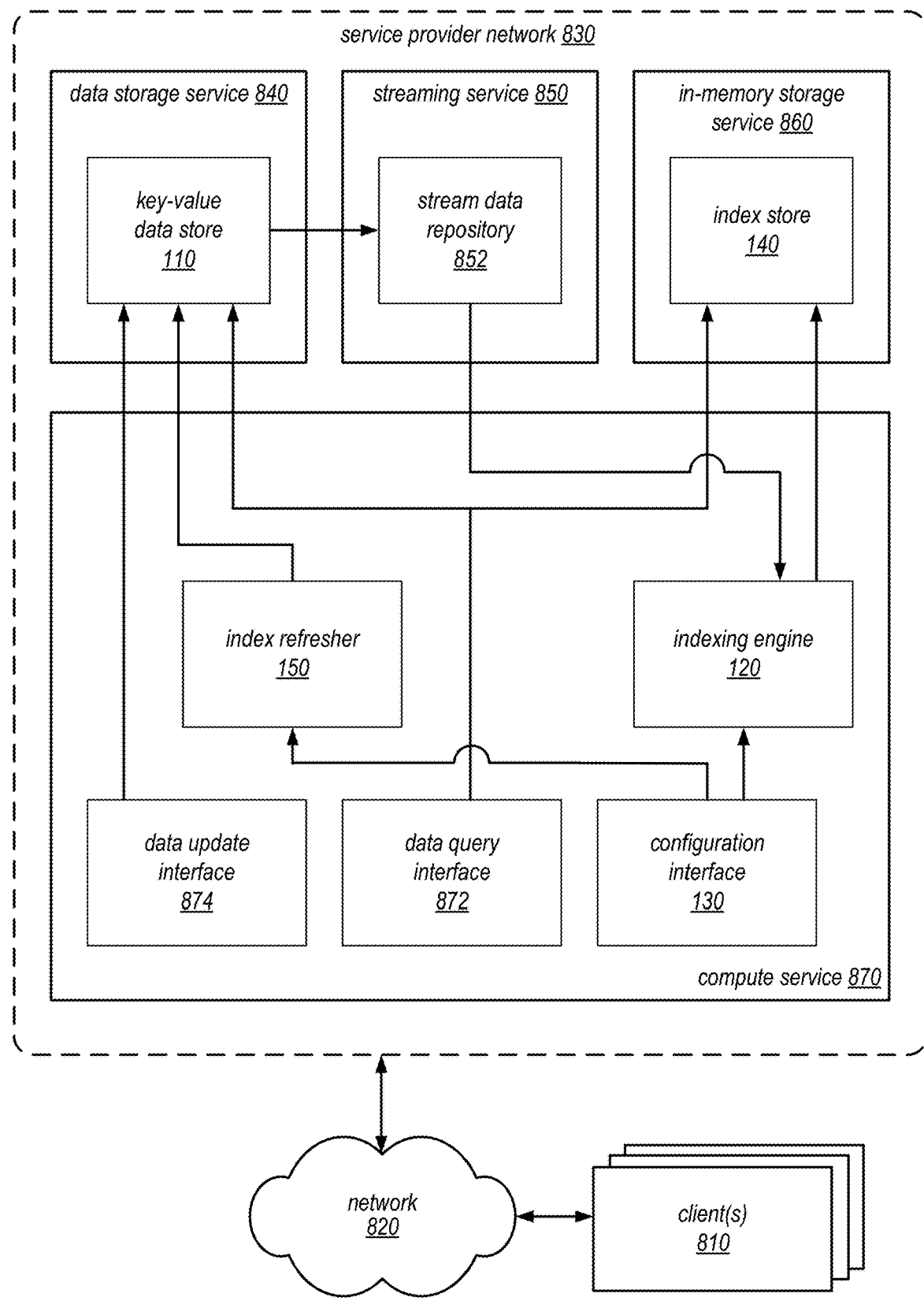
FIG. 8 illustrates an example implementation of a data store indexing system in a cloud-based provider network, according to some embodiments.

FIG. 8 illustrates an example implementation of a data store indexing system in a cloud-based provider network, according to some embodiments. As shown, in some embodiments, components of the indexing system 100 of FIG. 1 may be implemented as different services in a cloud-based service provider network 830.

In some embodiments, clients 810 of the provider network 830 may provide access the services via the service interfaces of the services, which may be accessed via a network such as network 820, as shown. In some embodiments, the network 820 may be a public network such as the Internet.

In some embodiments, the client(s) 810 may lease different amounts of computing resources for one or more type of service shown, and build the indexing system 100 using the leased services. The provider network 830 may operate a large number of compute nodes that may be provisioned and de-provisioned on demand to support the operations of each of these services. In some embodiments, the compute nodes may be implemented as virtual machine instances that execute on virtualization hosts.

As shown, in some embodiments, the data store 110 may be implemented as a data storage service 840, which may store data in storage objects and generate an update stream for the storage objects via an update stream generator 114, as discussed in connection with FIG. 1. In some embodiments, the data storage service 840 may be a clustered system using a number of storage nodes, which may be configured to auto-scale according to different conditions or auto-recover from partial failures of the system. In some embodiments, the update stream 116 that is generated from the data store 110 may be accessed via a streaming service 850, which may temporarily store streaming data for a variety of clients in a stream data repository 852. In some embodiments, the index store 140 of FIG. 1 may be implemented as an in-memory storage service 860. In addition, as shown, the service provider network also provides a compute service 870, which provides general compute instances (for example virtual machine instances) for use to implement other components of the indexing system, such as the index refresher 150, the indexing engine 120, the configuration interface or subsystem 130, a data update interface 874 that allows users to insert, delete, and update data in the data store 110, and a data query interface 872 that allows users to query the data via for example the query engine 710 as discussed in connection with FIG. 7.

In some embodiments, the compute service may support an easy onboarding feature, where with one or more simple commands from different users, the compute service may create different index stores or indexes for different users. In some embodiments, each of the components implemented in the compute service 870 may be configured to auto-scale based on the amount of data or access requests handled by those components. In some embodiments, the provider network 830 may also other services, which may be a producer to or consumer of the indexing system.

In some embodiments, each of the services may be implemented using one or more service endpoints configured to receive and process services requests. For example, the data storage service 840 may service requests to access tables maintained on behalf of clients 810 by a data store, and/or the items and attributes stored in those tables. For example, the services may include hardware and/or software configured to implement various service endpoints and to properly receive and process HTTP-based web services requests directed to those endpoints. In one embodiment, the services may be implemented as a server system configured to receive web services requests from clients and to forward them to various components that collectively implement a data storage system, event-driven execution system, object storage system, etc., for processing. In other embodiments, the services may be configured as a number of distinct systems (e.g., in a cluster topology) implementing load balancing and other request management features configured to dynamically manage large-scale web services request processing loads.

In various embodiments, the components in the services may be implemented directly within computer hardware, as instructions directly or indirectly executable by computer hardware (e.g., a microprocessor or computer system), or using a combination of these techniques. For example, the components of the data storage service 110 may be implemented by a distributed system including a number of computing nodes. In some embodiments, the functionality of a given storage service system component may be implemented by a particular computing node or may be distributed across several computing nodes. In some embodiments, a given computing node may implement the functionality of more than one service system component.

In some embodiments, the APIs provided by the services may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein. In some embodiments, the configuration of the index stores and indexing rules may be exposed as an API or feature of the data storage service 840, which may be configurable via the configuration interface 130.

In addition to functioning as an endpoint for clients' service requests, in some embodiments the provider network 830 or the individual services may implement various client management features. For example, data storage service 840 may coordinate the metering and accounting of client usage of services, including storage resources, by tracking the identities of requesting clients, the number and/or frequency of client requests, the size of tables and/or items stored or retrieved on behalf of clients, overall storage bandwidth used by clients, class of storage requested by client, and/or any other measurable client usage parameter. In some embodiments, the services may also implement financial accounting and billing systems, or may maintain usage data that may be queried and processed by external systems for reporting and billing of client usage activity.

The client(s) 810 for the provider network 830 may encompass any type of client configurable to submit service requests to a provider network. In some embodiments, a client 170 may include a suitable version of a web browser or a plug-in module for a web browser, or other type of code module configured to execute as an extension to or within an execution environment to provide database or data storage service clients (e.g., client applications, users, and/or subscribers) access to the services provided by provider network. Alternatively, a client 810 may encompass an application such as a database application, media application, office application or any other application that may make use of persistent storage resources. In some embodiments, an application may include sufficient protocol support (e.g., for a suitable version of Hypertext Transfer Protocol (HTTP)) for generating and processing web services requests without necessarily implementing full browser support for all types of web-based data. A client 810 may be an application configured to interact directly with the services. In some embodiments, a client 810 may be configured to generate web service requests according to a Representational State Transfer (REST)-style web services architecture, a document- or message-based web services architecture, or another suitable web services architecture.

In some embodiments, the data storage service 840 may provision computing resources to support a storage object 112. For example, in some embodiments, the storage object 112 may be hosted on one or more compute nodes or storage nodes in the service 840, which may be implemented as virtual machine instances running on virtualization hosts. In some embodiments, the compute or storage nodes may be provisioned or deprovisioned dynamically, based on factors such as the amount of data stored in the storage object 112, or the rate of requests that are directed to the storage object 112. In some embodiments, storage object 112 may be leased to a client based on the amount of access requests (e.g., read or write requests) that are directed to the storage object 112 during a period of time. In such embodiments, as more access requests are generated in the data store service 182 for the storage object 112, the costs associated with the storage object 112 will increase. However, by using other service components to maintain indexes for the storage object, such costs may be avoided or reduced.

In some embodiments, the index store 140 may be implemented as an in-memory storage service 860 hosted in the cloud, which may be accessible to clients via a service interface such as a web services interface or application programming interface (API). The in-memory storage service 860 may be addressed according to a variety of access schemes. In some embodiments, the index store may be implemented using a key-value store, where each memory location is assigned a key. As another example, the index store may be organized as a linear or multi-dimensional array or map of memory locations, which may be divided into pages, lines, slices, etc. In some embodiments, the in-memory storage service 860 may be configured and managed via a management interface, which may be implemented as a graphical user interface (GUI). For example, the in some embodiments of the service, the index store 140 cluster may be started, stopped, resized, recovered, or examined by an administrator via the configuration interface. In some embodiments, the in-memory storage service 860 may be configured to execute application-specific software modules, which may implement functions to be performed during read and write operations or other events, or periodically in the background. In some embodiments, these functions may be implemented using client-specific modules, which may enforce or perform certain application-specific logic on the index data. In some embodiments, the application-specific logic may be performed as part of an atomic read or write operation on the index store, so that the logic is performed either fully or not at all, but not partially.

In some embodiments, the services shown in the figure may all be independently scalable based on different factors. For example, in some embodiments, each of the data storage service 840, streaming service 850, in-memory storage service 860, and compute service 870 may automatically adjust its size or capacity based on different factors. For example, in some embodiments, the in-memory storage service 860 may be scaled according to the amount of traffic received in the update stream, while the data storage service 840 may be scaled according to the amount of data stored or the frequency of data accesses. By allowing the different services to scale independently, the indexing system can more flexibly adapt to changing constraints of its environment.

Figure 9A:
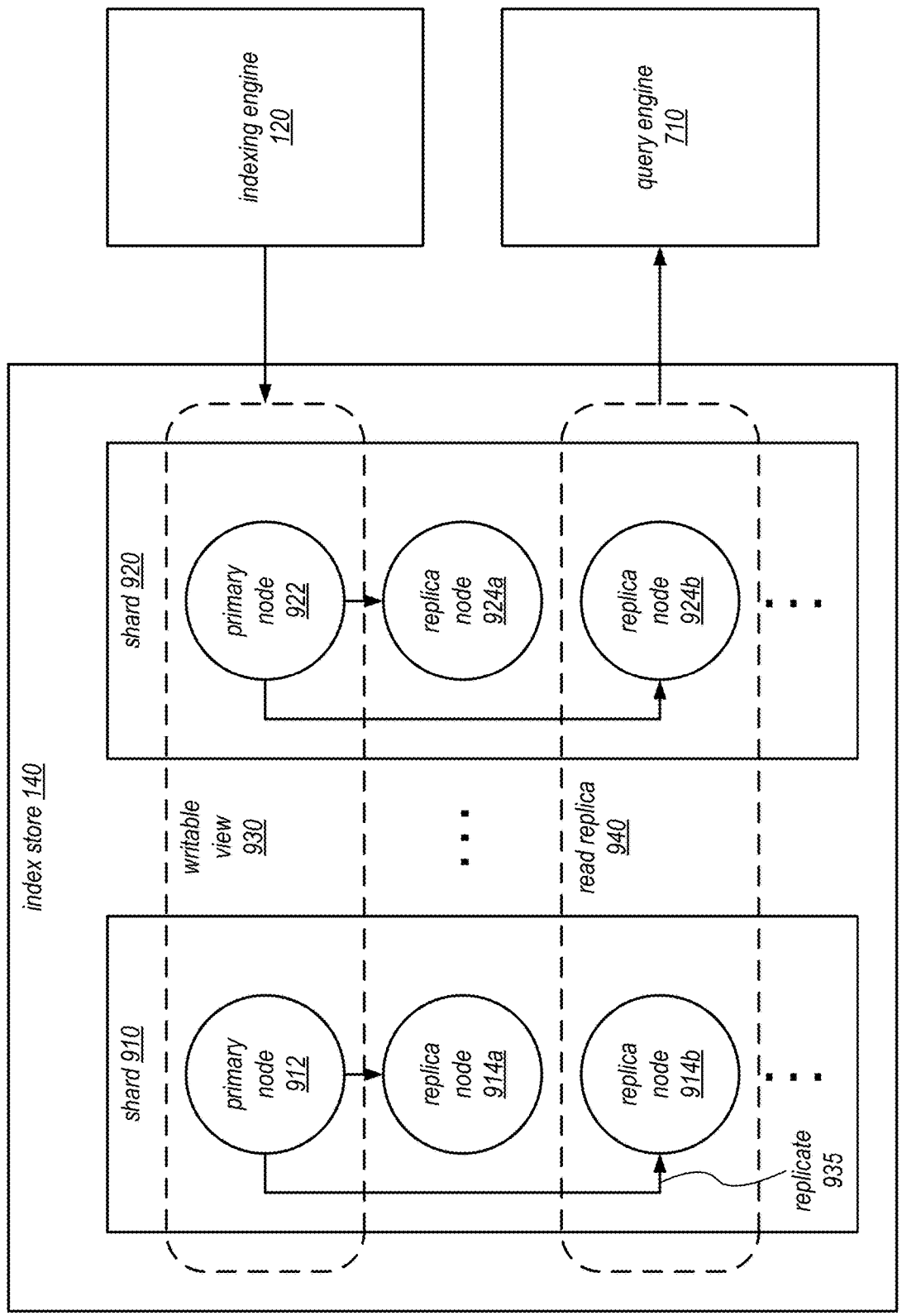
FIGS. 9A, 9B, and 9C illustrate components and operations of an implementation of a cluster-based in-memory index store that can used by the data store indexing system, according to some embodiments.
Figure 9B:
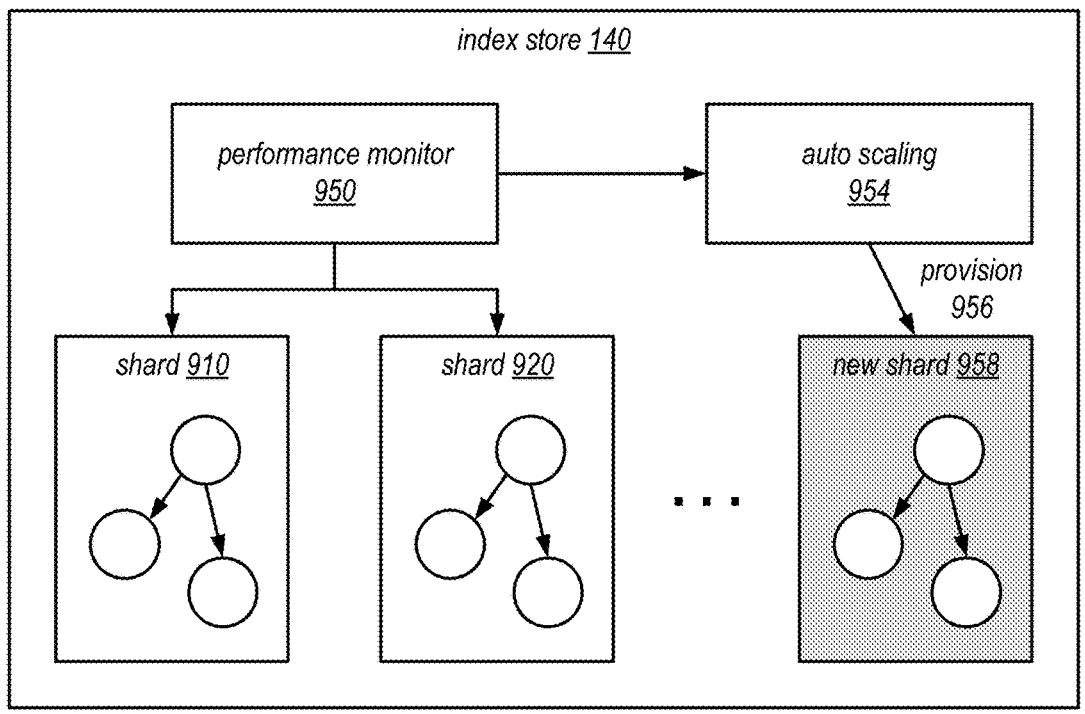
Figure 9C:
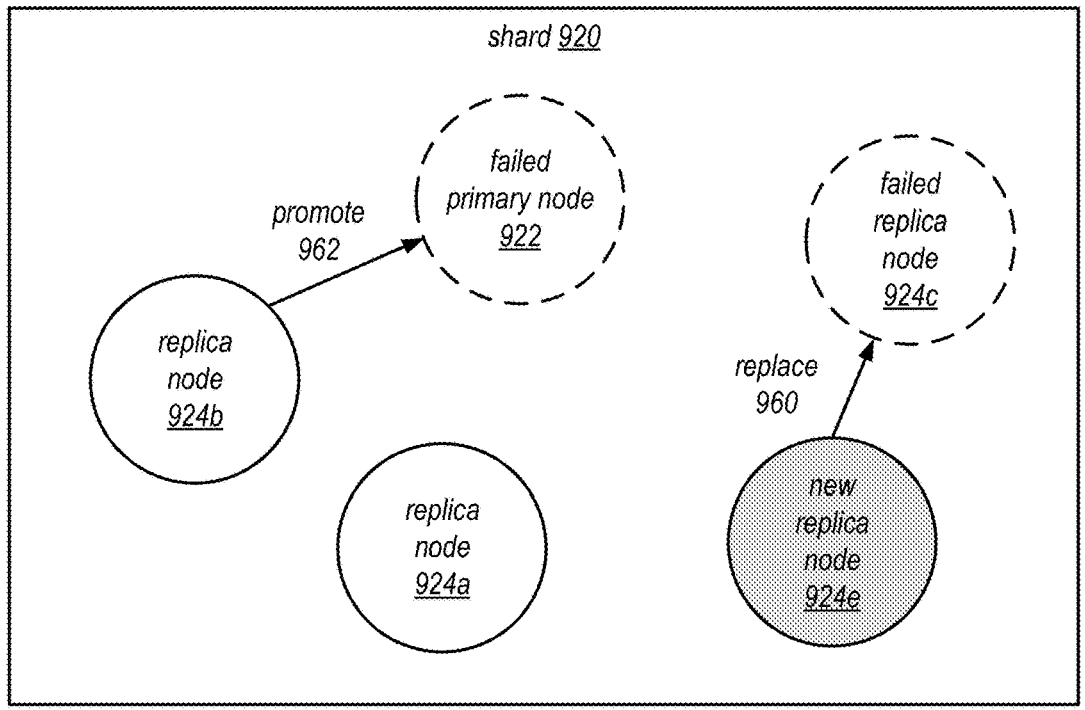

FIGS. 9A, 9B, and 9C illustrate components and operations of an implementation of a cluster-based in-memory index store that can used by the data store indexing system, according to some embodiments. The depicted index store 140 is implemented using a cluster that may be hosted in, for example, the in-memory storage service 860, as discussed in connection with FIG. 8. FIG. 9A depicts an embodiment of the index store cluster, showing an organization of cluster of nodes used to implement the index store.

As shown, the cluster may be implemented using a number of nodes, such as nodes 912, 914a, 914b, 922, 924a, and 924b. As shown, the index store 140 may include more or less nodes, depending on the embodiment. In some embodiments, the nodes may be independent compute nodes, each having separate processors and associated runtime memories. In some embodiments, these compute nodes may be implemented as virtual machine instances operating on physical virtualization hosts. The cluster of nodes may host portions of the index data in the index store 140 in their respective runtime memories, so that collectively, they are able to maintain an entire data set (e.g., the contents of all indexes) in runtime memory. In some embodiments, the index store cluster or the in-memory storage service 860 may monitor conditions in the cluster and adjusts membership of nodes in the cluster based on detected events (e.g., failing nodes, idleness, etc.)

As shown, in some embodiments, the cluster of nodes may be divided into shards such as shard 910 and shard 920, where each shard independently maintains a portion of the index data in the index store 140. For example, in some embodiments, data items in an index may be evenly distributed among the shards using a random but repeatable assignment algorithm. The shards 910 and 920 may be configured to operate independently, so that read or write requests directed to one shard may be performed wholly by nodes within that shard, and without impacting nodes in the other shard. In this manner, operational performance of the cluster is improved. Moreover, by sharding the data, the index store 140 is made scalable with respect to the size of the index data. For example, as index store grows in size, more shards may be added to the cluster to accommodate the data, without significantly adding to the complexity of performance burdens of the system. In some embodiments, the index store 140 may be configured to adjust its size dynamically by automatically provisioning or de-provisioning additional shards, based on the size of the index store or the rate of requests directed to the index store.

As shown, in some embodiments, the cluster may implement replication, where the data maintained in the memory of on one node is replicated at least partly in the memory of another node. Thus, for example, data maintained by the primary node 912 may be replicated by replica nodes 914a-b, and data maintained by the primary node 922 may be replicated by replica nodes 924a-b. In the illustrated example, the replication may be performed within each shard 910 and 920, so that each shard may comprise a separately recoverable unit. In some embodiments, to satisfy high-availability or durability requirements, the replica nodes 914 and 924 within a single shard may be implemented in a manner where they do not rely on common resources (e.g., power source or network interface), so that they are not likely to fail at the same time. In some embodiments, the replica nodes in a single shard may be located at different physical locations. In some embodiments, the replication may be performed using a synchronization protocol, where a master node forwards updates that it has accepted to a slave node. In some embodiments, one slave node may act as a master node to another slave node. In some embodiments, the shard may not acknowledge an index write as completed until some number of replica nodes have also acknowledged the write.

As shown, in some embodiments, a set of nodes across the shards (e.g., nodes 912 and 922) may collectively implement the writable view 930 of the cluster. In some embodiments, the writable view 930 may represent a view of the index store that may be updated by clients of the index store. Thus, for example, any writes to the index store performed by the indexing engine 120 may be handled by nodes in the writable view 930. As shown, in some embodiments, a second set of nodes across the shards (e.g., nodes 914b and 924b) may collectively form the read replica 940 of the contents of the cluster. In some embodiments, the read replica 940 may be read by clients of the index store, such as the query engine 710, but cannot be modified by the clients. Thus, such read replicas 940 allow the contents of the index store to be read by many different clients without impacting the index store's write performance.

FIG. 9B depicts a cluster performing an auto-scaling operation, according to some embodiments. As shown, in some embodiments, the index store 140 or cluster may include a performance monitor 950, which may be implemented on one or more control plane elements of the cluster. The performance monitor 950 may be registered to observe or configured to poll the different nodes in the cluster, or different shards in the cluster, such as shards 910 and 920. In some embodiments, if the performance measure of the shards degrades past a certain threshold, the performance monitor 950 may invoke an auto-scaling module 954 to provision 956 a new shard 958, and add the new shard 958 to the cluster. The new shard 958 may include new nodes that are launched or selected from a pool of reserve nodes. The new shard 958 may then be populated with a portion of the index from the existing shards of the cluster.

In some embodiments, the cluster may be configured to perform this auto-scaling automatically based on a number of factors. In some embodiments, a new shard may be added if the storage capacity of one or more existing shards falls below a threshold. In some embodiments, a new shard may be added if the number of requests handled by one or more shards raises above a threshold. In some embodiments, a new shard may be added to free up some storage or handle some traffic from a selection of different shards, so as to rebalance the workload of the existing shards. In some embodiments, if the performance monitor 950 determines that the cluster includes an excessive number of shards given its data size and request volume, the data in one or more shards may be consolidated to other shards, and those one or more shards may be released from the cluster.

FIG. 9C depicts the shard 920 performing a node replacement operation 960, and a node promotion or failover operation 962, according to some embodiments. As shown, on some occasions, a node (for example replica node 924c) may experience a failure. In that event, in some embodiments, a new node (for example node 924e) may be provisioned to replace the failing node 924c. The new node 924e may obtain a copy of the data maintained by failed node 924c from other replica nodes that has that portion. In some embodiments, during this replacement period, the cluster may continue to service access requests using its remaining nodes.

On some other occasions, a primary node 922 may experience a failure. In that event, in some embodiments, another node in the same shard (for example replica node 924b) may be promoted to take over the role of the failed primary node. Thus, the shard 920 may immediately convert a read replica node to a writeable primary node, so that subsequent writes to that shard will be handled by the new primary node. In this manner, the shard 920 stays highly available in the face of occasional node failures. In some embodiments, as the number of nodes in the cluster (and hence the frequency of node errors) increases, the cluster may employ a larger number of replicas to ensure the high availability of the index store.

Figure 10A:
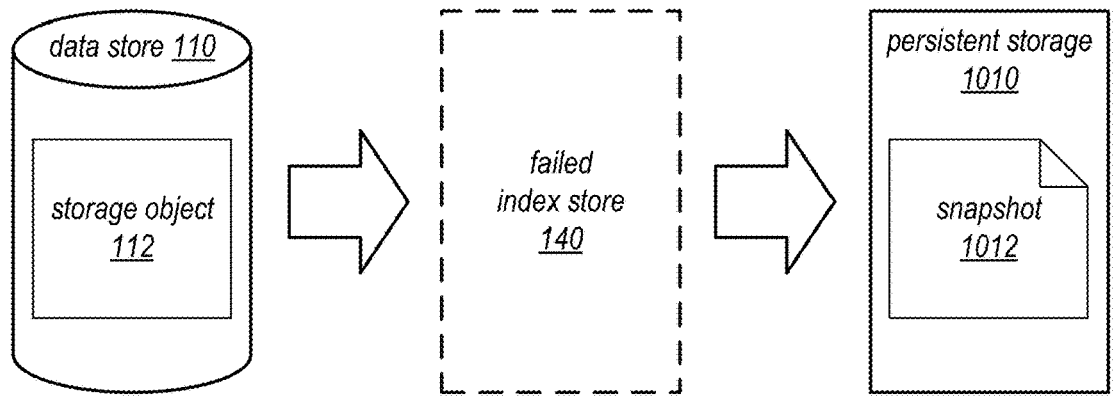
FIGS. 10A, 10B, and 10C illustrates steps in a recovery of an in-memory index store in a data store indexing system, according to some embodiments.
Figure 10B:
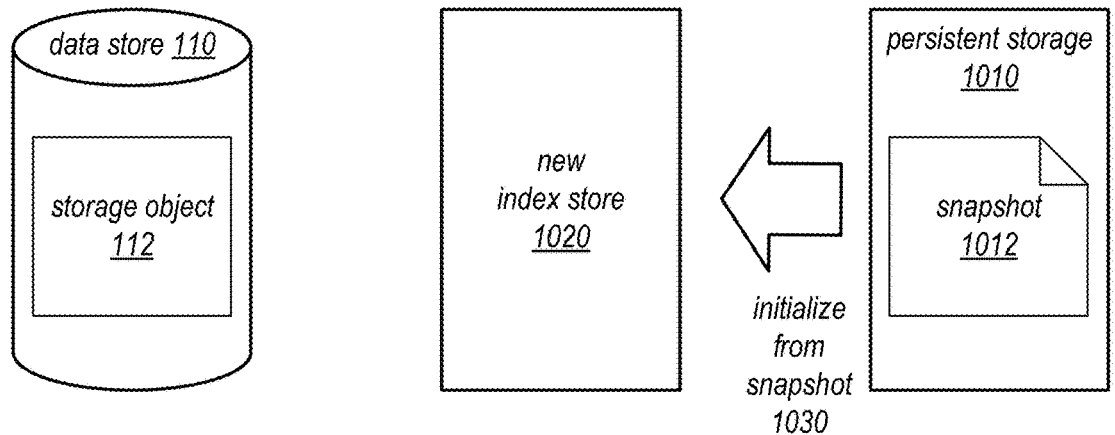
Figure 10C:
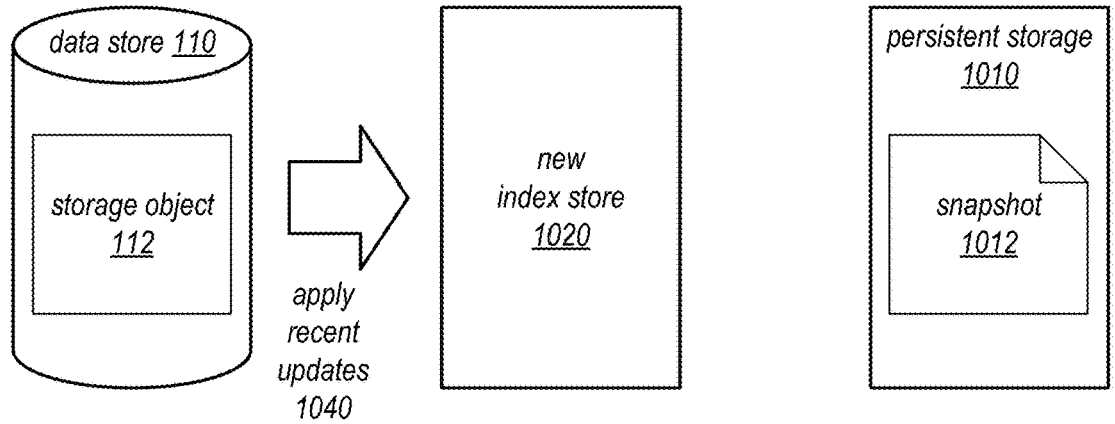

FIGS. 10A, 10B, and 10C illustrates steps in a recovery of an in-memory index store in a data store indexing system, according to some embodiments. The figures depict a process where an instance of the index store 140 has failed, and a new instance of the index store 1020 is used to replace the failed instance 140. In some embodiments, the depicted process may occur automatically, in response to a detected failure of the index store cluster supporting the indexing system. In some embodiments, the depicted process may be performed at least partly manually, based on inputs from an administrator of the system.

As shown, in FIG. 10A, a first instance of the index store 140 has experienced a failure. As shown, prior to the failure, a snapshot 1012 may be generated for the index store 140 that reflects its current contents. The snapshot may be stored in a persistent storage 1010 for backup. In some embodiments, the snapshot 1012 may be generated periodically to capture the state of the index store over increments of time. In some embodiments, a new instance of the index score may be quickly populated using the snapshot 1012.

The failure of the index store 140 may be detected via a variety of mechanisms. For example, in some embodiments, other components in the indexing system may monitor or be registered to listen for heartbeat message from the index store 140. In some embodiments, when the index store 140 is behaving unacceptably (e.g., exhibiting unusually long latency), the indexing system may automatically decide to restart the index store. As discussed, in some embodiments, the index store may be implemented as part of an in-memory storage service (e.g., service 860 of FIG. 8), so that external interactions with the service are performed through a service interface of the in-memory storage service, such as an API or a network protocol, etc. In some embodiments, the during the recovery process, executions of components such as the indexing engine and query engine that rely on the index store may be temporarily suspended.

As shown, in FIG. 10B, a new instance of the index store 1020 is launched. In some embodiments, the launching of the new instance may occur automatically as part of the recovery behavior of the index store. In some embodiments, the recovery process may be managed by an external client, which may make an explicit service request to the in-memory storage service to relaunch an index store.

As shown, in some embodiments, after the new instance of the index store 1020 is up and running, the indexing system may reinitialize 1030 the index store instance 1020 from the previously generated snapshot 1012. In some embodiments, the system may simply choose the last complete snapshot that was generated before the failure. In some embodiments, the reinitialization may be performed using a snapshot loading tool that is configured to parse the snapshot 1012, and load the contents of the snapshot 1012 into the new instance of the index store 1020. In some embodiments, the loading tool may convert the snapshot 1012 into an update stream, and feed the update stream to the indexing engine to populate the index store 1012. In some embodiments, the creation time of the snapshot 1012 is noted, so that in a next step, updates to the storage object 112 occurring after the snapshot 1012 may be selected and applied to the index store 1020.

As shown, in FIG. 10C, additional updates are applied 1040 to the new instance of the index store 1020. In some embodiments, the additional updates are recent updates that have occurred to the storage object 112 after the snapshot 1020 was taken. The additional updates may be determined in a number of ways. In some embodiments, the additional updates may be determined by examining update timestamps associated with data items in the storage object 112, and all data items that have an update timestamp after the snapshot 1012 are selected to be applied 1040 to the new index store 1020. In some embodiments, the update stream, for example update stream 116 of FIG. 1, may continue to capture updates to the storage object 112 even after the failure of the index store 140. In some embodiments, these updates may be maintained within the stream repositories for a period of time, for example 24 hours. Accordingly, in some embodiments, the application 1040 of recent updates may occur from the stream repositories using the normal update functions, such as via the indexing engine 120 of FIG. 1.

In some embodiments, the recovery process may not use a snapshot of the index store. Rather, the index store may be restored using just the data store 110. In some embodiments, the recovery may occur by touch updates performed on all data items in all relevant storage objects in the data store. In some embodiments, the recovery may occur without using the update stream mechanism, for example with a query of the storage objects. In some embodiments, the ETL files may be produced from the storage objects, and consumed via a load tool to populate the index store. At the conclusion of the recovery process, the contents of the new index store 1020 will once again reflect the current state of the storage object 112.

Figure 11:
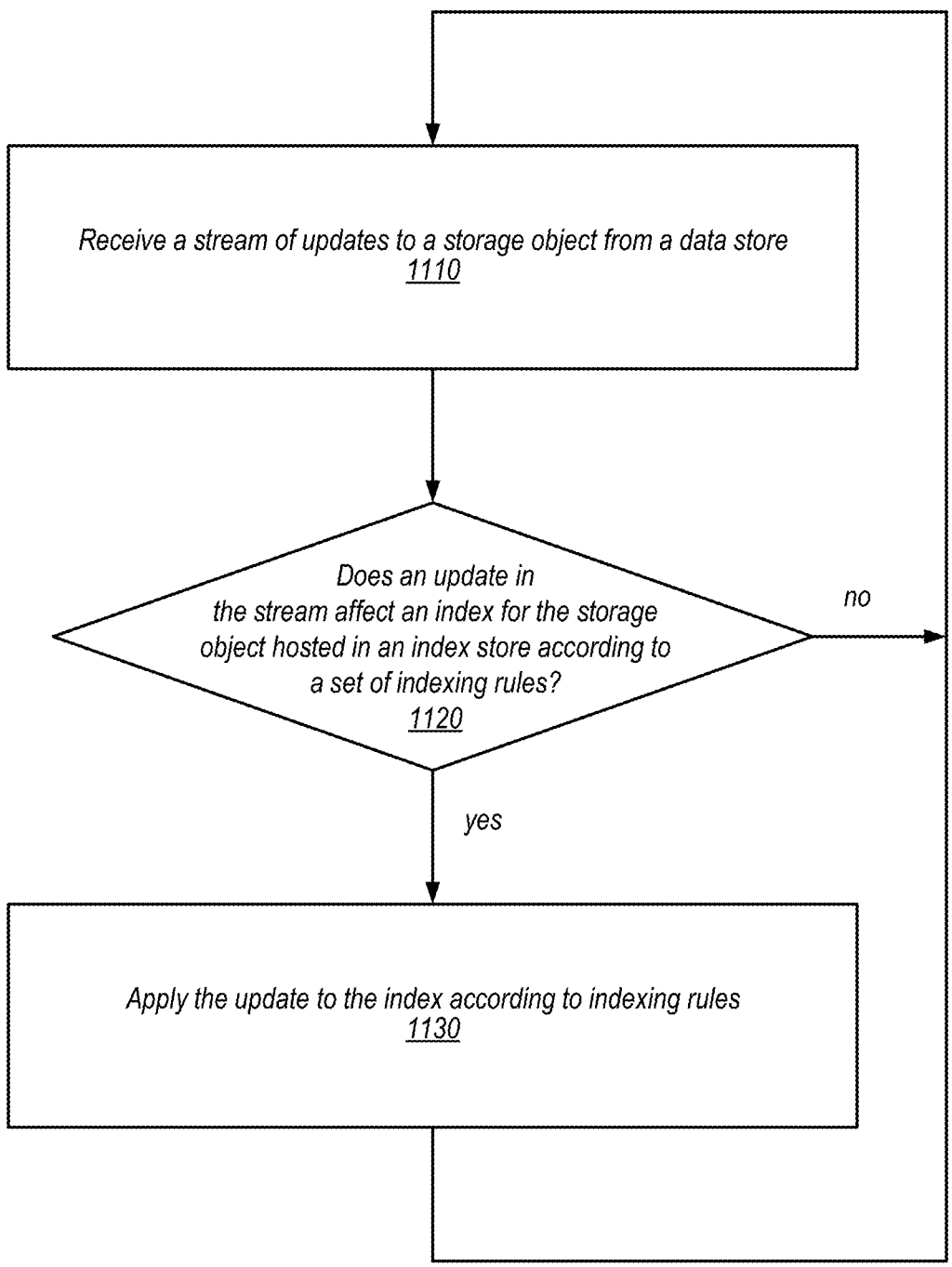
FIG. 11 is a flowchart illustrating a process of updating an index in a data store indexing system based on an update in the underlying data store, according to some embodiments.

FIG. 11 is a flowchart illustrating a process of updating an index in a data store indexing system based on an update in the underlying data store, according to some embodiments. In some embodiments, process in the figure may be performed via an indexing engine, such as indexing engine 120 discussed in connection with FIG. 1.

The process begins at operation 1110, where a stream of updates to a storage object is received from a data store. In some embodiments, the storage object may contain data items having individual keys and data values, and the data store may be configured to generate an update stream of updates that have been made to the storage object in a time-ordered sequence. The indexing engine may be registered to listen to and receive the updates in stream form. In some embodiments, the update stream may be generated as a feature of the data store. In some embodiments, the update stream may be implemented or exposed via a streaming service that temporarily stores stream items in a stream data store. In some embodiments, updates may be received from an Extract, Load, and Transform (ETL) file, which may be produced from the storage object, and then converted to an update stream.

At operation 1120, a determination is made whether an update in the stream affects an index for the storage object hosted in an index store. The determination may be made according to a set of indexing rules for the index. In some embodiments, the index store may host many indexes for many storage objects, which are used to improve query performance for the storage objects. In some embodiments, the indexing engine may be configured to map received updates to those indexes that are impacted by each update. In some embodiments, the mapping may be specified in indexing rules for each index, which may be stored in a configuration store accessible by the indexing engine. For example, an indexing rule for the index may specify one or more filter criteria for the index, so that some data items not satisfying the filter criteria are not applied to the index. However, where an updated data item does affect an index, the process proceeds to operation 1130.

In some embodiments, both the indexing engine and the index store may be separate from the data store, so that indexes maintained by the indexing system do not rely on resources of the data store, except for the update stream(s). In some embodiments, the index store may implement an in-memory data store so that the contents of the indexes are hosted in the runtime memory of one or more computers or compute instances. In some embodiments, the index store may be implemented using a cluster of compute nodes, which may be virtual machine instances. In some embodiments, the index store may be implemented or exposed as a service, such as a cloud-based or web service. As discussed, in some embodiments, the index store may be accessed much more quickly than the data store storing the storage object, so that it is suitable for use to service queries.

At operation 1130, the update is applied to the index according to the indexing rules. In some embodiments, the indexing rule may specify that one or more attribute of the updated data item should be included in the index. In some embodiments, the indexing rules may specify one or more transformations of the updated data item before it is stored in the index. For example, the values in the data item may be converted (e.g., Celsius to Fahrenheit), some values may be average or summed, etc. In some embodiments, some new values may be generated as filler attributes, based on other attributes in the data item, or based on other attributes (e.g., current time, a monotonically increasing identifier value, etc.) In some embodiments, the indexing rules may specify that multiple data items should be aggregated to form an aggregate row, based on specified aggregation logic. Finally, the resulting data item may be placed in the index in a proper location, according to the sort criteria of the index, which may also be specified in the indexing rules. In some embodiments, the indexing engine may be able to manipulate the index store directly, for example by directly accessing data addresses in the index store. In some embodiments, the indexing engine may access the index store as a service client, via the index store's service interface. Depending on the embodiment, some of the transformation operations may be performed by the indexing engine, and some of the transformation operations may be performed within the index store.

Finally, after operation 1130, the process returns back to operation 1110, where additional updates are received. In this manner, the process continuously takes updates to the storage object and applies the updates to the indexes associated with the storage object.

Figure 12:
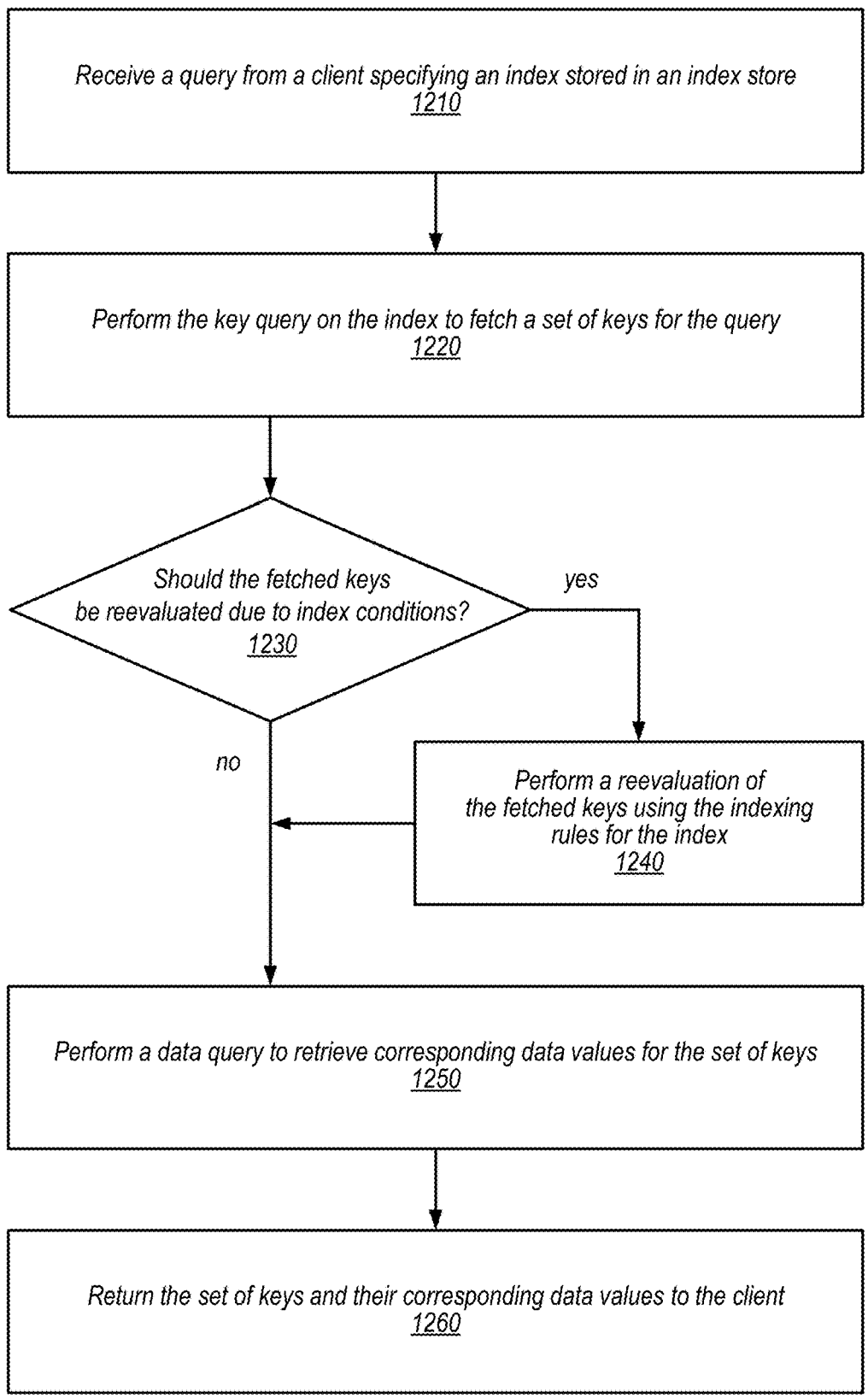
FIG. 12 is a flowchart illustrating a process of performing a query using a data store indexing system, according to some embodiments.

FIG. 12 is a flowchart illustrating a process of performing a query using a data store indexing system, according to some embodiments. In some embodiments, the process depicted in the figure may be performed by a query engine implemented by the data store indexing system, for example query engine 710 of FIG. 7.

At operation 1210, a query is received from a client specifying an index stored in the index store. The index store may be, for example, index store 140 as discussed in connection with FIG. 1. In some embodiments, the query may be specified via a query language such as SQL. In some embodiments, the query may be specified via a programmatic interface such as an API or web services interface. In some embodiments, the query may be specified via a user interface. In some embodiments, the indexes stored in the index store may be used to speed up queries performed in a data store, which may be slower to access and scan than the index store. In some embodiments the index store may be an in-memory data store.

At operation 1220, a key query is performed using the index to fetch a set of keys for the query. In some embodiments, the index may store data items sorted and filtered according to one or more criteria specified in indexing rules, so that for certain queries, obtaining the keys from the index may be performed quickly, without requiring a scan of the full contents of the index. In some embodiments, the index may be maintained as an in-memory data structure, further improving the performance of the query. In some embodiments, using the index to find the keys for the query is much faster than querying for the keys from the storage object in the data store. In some embodiments, the index store may able to perform complex queries within the index store, so the query engine may directly pass the query criteria to the index store. In some embodiments, the index store may only support certain lower level data fetching operations, and the query engine may perform some degree of processing of the query before data fetch commands and sent to the index store.

At operation 1230, a determination is made whether the fetched keys should be reevaluated due to index conditions. As discussed, in some embodiments, the index may be populated from an update stream of the storage object, which may be provided by the data store. An indexing engine may take the update stream and apply relevant updates in the stream to the index. In some embodiments, the index may become out of date with respect to the storage object. For example, in some cases, the sheer volume of updates in the update stream may be too much for the indexing engine to process immediately (e.g., immediately following a indexing rule change). In some embodiments, the indexing engine or the streaming from the data store may be stopped or suspended for a period due to various problems, or the indexing engine may be configured to process certain streams in a low priority mode. In such situations, an index condition may indicate that the index is out-of-date, and that some keys returned from the index may need to be reevaluated against the indexing rules.

If it is determined that the reevaluation of fetched keys is not needed, the process proceeds directly to operation 1250. However, if a reevaluation is needed, the process proceeds to operation 1240, where the revaluation of the fetched keys is performed using the indexing rules for the index. Thus, the fetched keys (and relevant attributes) of each data item may be checked to determine if they fall within the filtering criteria of the index being queried. The evaluation may also perform a re-sorting of keys and other transformations specified by the indexing rules. In some embodiments, the reevaluation may simply update the index with its evaluation results, prior to performance of the key query on the index. In some embodiments, the reevaluation may be performed after the keys are fetched from the index. In this manner, the query engine ensures that all keys returned from the key query satisfies the current indexing rules of the index in question.

At operation 1250, a data query is performed to retrieve corresponding data values for the set of keys. In some embodiments, the data query may be performed on the storage object in the data store. Although the data store may be slower data store than the index store, in some embodiments, fetching data items from the data store using a set of keys is much faster than scanning the storage object in the data store using the query criteria and/or sorting the results based on sort criteria. In some embodiments, the index store may host an index that has the needed data values for the query (e.g., in a universe index). In that case, in some embodiments, the data query may be performed using that index, without accessing the data store. In some embodiments, where operation 1240 is performed using an index and the data values are obtained from the same index, the key query and the data query may be collapsed into a single query, thus further improving query performance.

At operation 1260, the set of keys and their corresponding data values are returned to the client. Depending on the query interface of the query engine, the results may be returned in a variety of formats. In some embodiments, the query engine may be returned the results all at once, in a batch file or a stream. In some embodiments, the query engine may implement a pagination mechanism, whereby results may be returned to the client a page at a time. The client may be provided with a cursor, pagination token, or some other object, that allows the client to navigate through the results pages and consume the results at its own pace.

Figure 13:
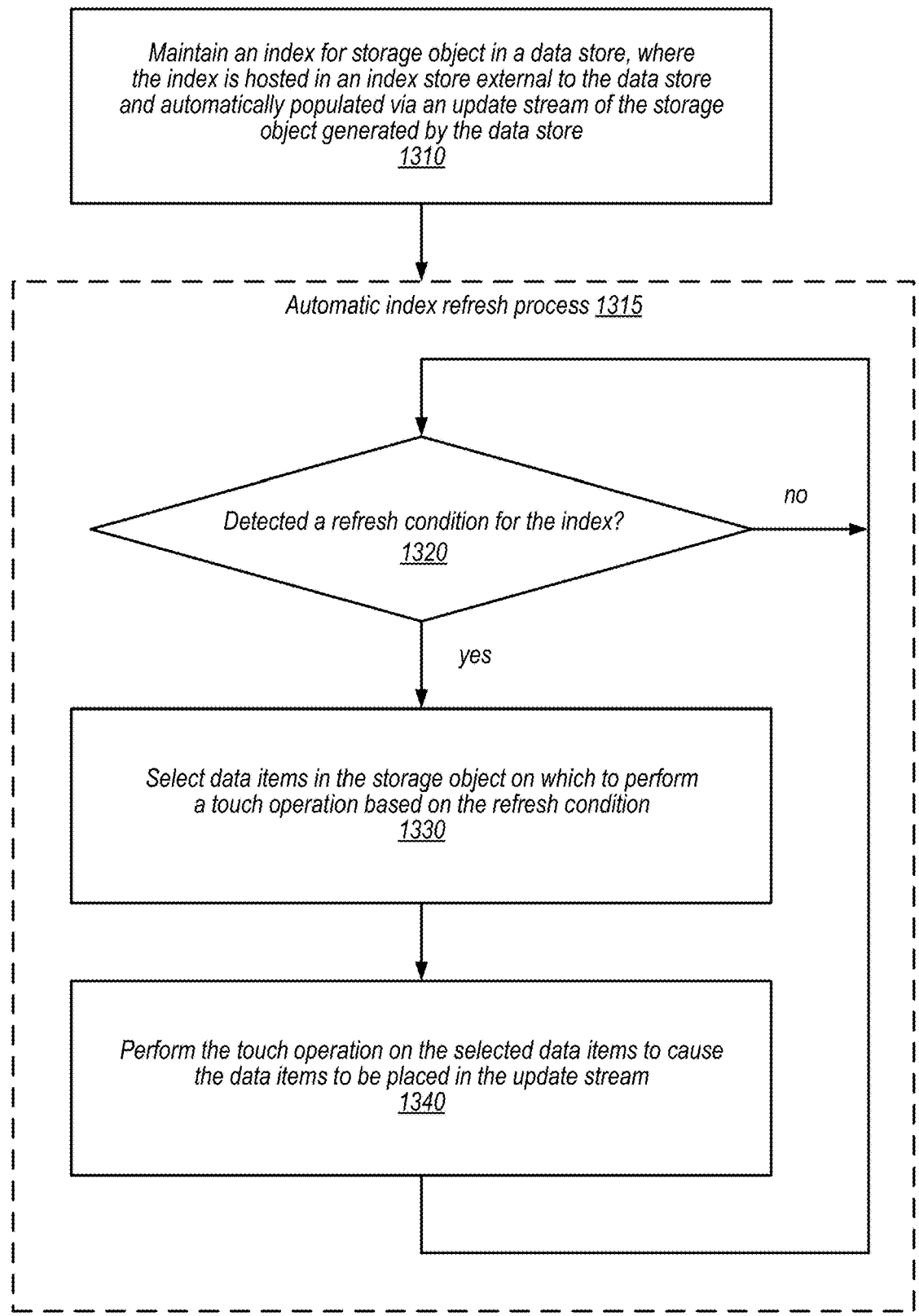
FIG. 13 is a flowchart illustrating a process of refreshing an index in a data store indexing system, according to some embodiments.

FIG. 13 is a flowchart illustrating a process of refreshing an index in a data store indexing system, according to some embodiments. In some embodiments, the process depicted in the figure may be performed by an index refresher implemented by the data store indexing system, for example index refresher 150 as discussed in connection with FIGS. 1 and 5.

At operation 1310, an index is maintained for a storage object in a data store. As discussed, in some embodiments, the index is hosted on in an index store 140 that is separate from and external to the data store. In some embodiments, the index is automatically populated via an update stream of the storage object generated by the data store. As discussed, the update stream may be received and processed by an indexing engine 120, which then applies relevant updates to indexes in the index store. Operation 1310 may be performed as a continuous loop, as depicted for example in FIG. 11.

Operations 1320, 1330, and 1340 may implement an automatic refresh process 1315 that is automatically and continuously performed by, for example, the index refresher as discussed in connection with FIGS. 1 and 5. The process 1315 may continuously monitor for refresh conditions for an index, and when one condition is detected, perform operations to refresh the index. Thus, at operation 1320, the process continuously checks if a refresh condition has been detected. If not, the process may do nothing. If so, the process proceeds to operation 1330 to perform a refresh of the index.

Depending on the embodiment, an index refresh may be initiated by a variety of refresh conditions. In some embodiments, an index refresh may be automatically started due to a change of an indexing rule for an index, or when a new index is created. In some embodiments, an index refresh may be caused as a result of an explicit command from a user. In some embodiments, the data store indexing system may implement a policy where certain indexes are periodically flushed. In some embodiments, the index refresh may occur due to conditions detected in a periodic scan of the data in the data store. For example, in some embodiments, the index may have a filtering criterion that only data for the last 24 hours should be reflected in the index. Thus, a sweeper may periodically scan the storage object to refresh (e.g., remove) data items that are older than 24 hours. In some embodiments, the triggering conditions for the index refresh process may be configurable via a configuration of the data store indexing system.

At operation 1330, a set of data item are selected from the storage object to be touched based on the refresh condition. In some embodiments, the touch operation will cause the touched data item to be refreshed in the index. In some embodiments, the refresh process may simply touch all data items in the storage object. However, this approach may in some cases generate a large amount of traffic to the index store. To avoid this result, in some embodiments, only a selected subset of the data items in the storage object may be touched. The selection may be dependent on the condition that caused the refresh operation. For example, in some embodiments where the refresh is caused by an indexing rule change, the touch operation may be limited to only those data items that satisfy the old or the new filtering criteria in the indexing rules. In some embodiments, the index refresh may touch data items in batches, on a schedule. In this case, the touched data items may be limited to a range of data items that is specified according to the schedule. In some embodiments, the selection of data items to be touched may be configurable via a configuration interface. In some embodiments, the configuration interface may allow for a configuration of the speed of the refresh process, so that more important indexes may be refreshed more quickly by more frequent and larger touches, while less important indexes may be refreshed less quickly.

At operation 1340, the touch operation is performed on the selected data items. The touch operation may cause the touched data items to be placed in the update stream. As discussed, in some embodiments, the update stream is fed to the indexing engine, so that all updates in the stream are automatically applied to the indexes in the index store. In some embodiments, as discussed, the touch operation may be tantamount to an update of the data item, causing the data item to be placed into the storage object's update stream. In some embodiments, the touch operation may update a metadata attribute of a data item, such as a version number. In some embodiments, this metadata attribute may not be used by clients of the data store, or may be inaccessible or invisible to clients of the data store. In some embodiments, the touch operation may not update the data items at all, but rather only place them in the update stream. In some embodiments, the touch operation may be performed as a background process in the data store, and only occur when the data store is not busy.

As shown, the process then loops back to operation 1320, so that the refresh process repeats continuously. In some embodiments, at any given time, the index refresher may be performing a number of index refresh operations (e.g., to touch data items in different storage objects). In some embodiments, the progress of different refresh operations may be tracked via a progress monitor, which may allow the progress of the refresh operations be viewed via a user interface of the data store indexing system. In some embodiments, the user interface may allow the user to pause, restart, speed up, slow down, or otherwise configure ongoing refresh operations.

Figure 14:
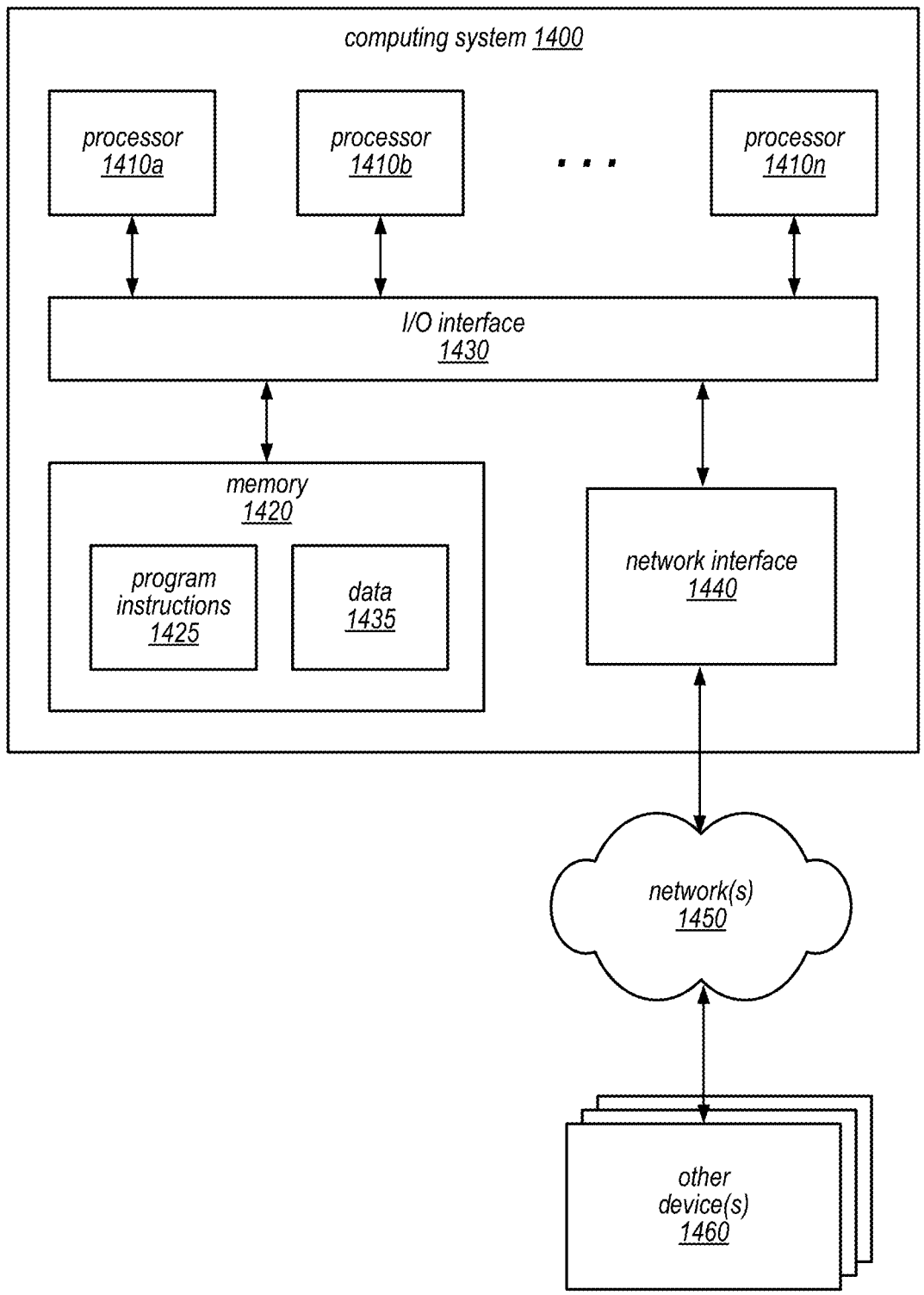
FIG. 14 is a block diagram illustrating an example computer system that can be used to implement one or more portions of a data store indexing system that performs automated refreshing of indexes, according to some embodiments.

FIG. 14 is a block diagram illustrating an example computer system that can be used to implement one or more portions of a data store indexing system that performs automated refreshing of indexes, according to some embodiments. Computer system 1400 may include or be configured to access one or more nonvolatile computer-accessible media. In the illustrated embodiment, computer system 1400 includes one or more processors 1410 coupled to a system memory 1420 via an input/output (I/O) interface 1430. Computer system 1400 further includes a network interface 1440 coupled to I/O interface 1430.

In various embodiments, computer system 1400 may be a uniprocessor system including one processor 1410, or a multiprocessor system including several processors 1410 (e.g., two, four, eight, or another suitable number). Processors 1410 may be any suitable processors capable of executing instructions. For example, in various embodiments, processors 1410 may be general-purpose or embedded processors implementing any of a variety of instruction set architectures (ISAs), such as the x86, PowerPC, SPARC, or MIPS ISAs, or any other suitable ISA. In multiprocessor systems, each of processors 1410 may commonly, but not necessarily, implement the same ISA.

System memory 1420 may be configured to store instructions and data accessible by processor(s) 1410. In various embodiments, system memory 1420 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1420 as code 1425 and data 1435.

In one embodiment, I/O interface 1430 may be configured to coordinate I/O traffic between processor 1410, system memory 1420, and any peripheral devices in the device, including network interface 1440 or other peripheral interfaces. In some embodiments, I/O interface 1430 may perform any necessary protocol, timing or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. Also, in some embodiments some or all of the functionality of I/O interface 1430, such as an interface to system memory 920, may be incorporated directly into processor 1410.

Network interface 1440 may be configured to allow data to be exchanged between computer system 1400 and other devices 1460 attached to a network or networks 1450, such as other computer systems or devices, such as routers and other computing devices, as illustrated in FIGS. 1 through 13, for example. In various embodiments, network interface 1440 may support communication via any suitable wired or wireless general data networks, such as types of Ethernet network, for example. Additionally, network interface 1440 may support communication via telecommunications/telephony networks such as analog voice networks or digital fiber communications networks, via storage area networks such as Fibre Channel SANs, or via any other suitable type of network and/or protocol.

In some embodiments, system memory 1420 may be one embodiment of a computer-accessible medium configured to store program instructions and data as described above for FIGS. 1 through 13 for implementing embodiments of methods and apparatus for traffic analysis. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1400 via I/O interface 1430. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 1400 as system memory 1420 or another type of memory. Further, a computer-accessible medium may include transmission media or signals such as electrical, electromagnetic, or digital signals, conveyed via a communication medium such as a network and/or a wireless link, such as may be implemented via network interface 1440.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
one or more processors; and
one or more memories having instructions stored thereon which, when executed by the one or more processors, cause the one or more processors to implement:
a data store that stores a storage object containing keys and corresponding data values of data items and outputs a stream of updates made to the storage object;
a configuration system separate from the data store that receives a definition of an index for the storage object, wherein the definition includes (a) one or more indexing rules that specify a filtering or sorting criteria for the index and (b) a refresh configuration for the index;
an index store that hosts the index for the storage object, wherein the index includes at least a subset of the keys in the storage object, filtered or sorted based at least in part on the one or more indexing rules;
an indexing engine external to the data store that performs the following operations:
receive the stream of updates to the storage object;
determine, based at least in part on the filtering or sorting criteria for the index specified by the one or more indexing rules, that an update in the stream applies to the index; and
apply the update to the index based at least in part on the one or more indexing rules;
an index refresher that performs the following operations:
detect a refresh condition for the index based at least in part on the refresh configuration for the index, wherein the refresh configuration specifies (a) one or more refresh conditions for triggering executions of refresh operations on the index and (b) one or more timing parameters that impact a speed of triggered refresh operations; and
responsive to the detection of the refresh condition for the index, execute a refresh operation according to the one or more timing parameters, wherein the refresh operation causes the data store to place update records of at least a subset of data items in the storage object into the stream of updates; and
a query engine that performs queries on the storage object using the index.

2. The system of claim 1, wherein the index store comprises an in-memory data store hosted on a cluster of compute nodes.

3. The system of claim 1, wherein the refresh operation is performed on data items in the storage object that are impacted by a change to the one or more indexing rules.

4. The system of claim 1, wherein the query engine performs the following operations: receive a query from a client specifying the index; perform a key query on the index to retrieve a set of keys for data items satisfying the query; perform a data query to retrieve corresponding data values for the set of keys; and return the set of keys and their corresponding data values to the client.

5. The system of claim 4, wherein to perform the key query, the query engine performs a reevaluation of keys fetched from the index based at least in part on the one or more indexing rules and excludes from the set of keys one or more fetched keys that do not satisfy the one or more indexing rules.

6. A method, comprising:
performing, by an indexing engine implemented by one or more hardware processors and associated memory:
receiving, via a configuration interface separate from a data store, a definition of an index for a storage object in the data store, wherein the index is hosted in an index store external to the data store, and the definition includes (a) one or more indexing rules that specify a filtering or sorting criteria for the index and (b) a refresh configuration for the index;
receiving a stream of updates made to the storage object in the data store, the stream generated by the data store;
determining that an update in the stream of updates applies to the index based at least in part on the one or more indexing rules that specify the filtering or sorting criteria for the index;
in response to the determination, applying the update to the index based at least in part on the one or more indexing rules;
detecting a refresh condition for the index based at least in part on the refresh configuration for the index, wherein the refresh configuration specifies (a) one or more refresh conditions for triggering executions of refresh operations on the index and (b) one or more timing parameters that impact a speed of triggered refresh operations; and
in response to the detection of the refresh condition, executing a refresh operation according to the one or more timing parameters, wherein the refresh operation causes the data store to place update records of at least a subset of data items in the storage object into the stream of updates.

7. The method of claim 6, wherein the index store hosts a plurality of indexes for the storage object with respective indexing rules, and wherein said determining that the update applies to the index and said applying the update to the index are performed without generating activity in the data store.

8. The method of claim 6, wherein the refresh operation is performed due to an interruption in the stream of updates, and the refresh operation causes data items that have changed since the interruption to be placed in the stream of updates.

9. The method of claim 6, wherein detecting the refresh condition is performed based at least in part on a periodic scan of the data items in the storage object.

10. The method of claim 6, wherein detecting the refresh condition comprises detecting that the one or more indexing rules associated with the index have changed.

11. The method of claim 6, further comprising selecting the subset of data items for the refresh operation based at least in part on an indexing rule that has changed.

12. The method of claim 6, wherein the refresh operation causes the data store to update a metadata attribute of the subset of data items, wherein the metadata attribute is not used by client applications of the data store.

13. The method of claim 6, further comprising: receiving a query specifying the index; performing a key query on the index store to retrieve a set of keys for data items satisfying the query; performing a data query to retrieve corresponding data values for the set of keys; and returning the set of keys and their corresponding data values in a result set to the query.

14. The method of claim 13, wherein performing the key query comprises reevaluating keys fetched from the index based at least in part on the one or more indexing rules and excluding from the set of keys a fetched key that does not satisfy the one or more indexing rules.

15. The method of claim 13, wherein performing the data query comprises performing the data query on the index store.

16. The method of claim 6, wherein the index store is implemented in an in-memory data storage service hosted on a cluster of compute nodes, and applying the update to the index comprises sending the update to the in-memory data storage service via a service interface of the in-memory data storage service.

17. The method of claim 16, further comprising: performing, by the in-memory data storage service: receiving the update via the service interface; applying the update to a writeable view of the index hosted on a first set of nodes; and replicating the update to a read replica of the index hosted on a second set of nodes, wherein queries to the index are performed via the second set of nodes.

18. The method of claim 6, wherein: receiving the stream of updates comprises receiving a first partial update to a data item in the storage object and a second partial update to the data item, wherein the two partial updates modify different attributes of the data item; and further comprising performing, by the indexing engine: applying the first partial update to the index based at least in part on the one or more indexing rules; and applying the second partial update to the index based at least in part on the one or more indexing rules and the first partial update.

19. A non-transitory computer-accessible storage medium storing program instructions that when executed on one or more processors implement an indexing engine and cause the indexing engine to:
  receive, via a configuration interface separate from a data store, a definition of an index for a storage object in the data store, wherein the index is hosted in an index store external to the data store, and the definition includes (a) one or more indexing rules that specify a filtering or sorting criteria for the index and (b) a refresh configuration for the index;
  receive a stream of updates made to the storage object in the data store, the stream generated by the data store;
  determine that an update in the stream of updates applies to the index based at least in part on the one or more indexing rules that specify the filtering or sorting criteria for the index;
  in response to the determination, apply the update to the index based at least in part on the one or more indexing rules;
  detect a refresh condition for the index based at least in part on the refresh configuration for the index, wherein the refresh configuration specifies (a) one or more refresh conditions for triggering executions of refresh operations on the index and (b) one or more timing parameters that impact a speed of triggered refresh operations; and
  in response to the detection of the refresh condition, execute a refresh operation according to the one or more timing parameters, wherein the refresh operation causes the data store to place update records of at least a subset of data items in the storage object into the stream of updates.

20. The non-transitory computer-accessible storage medium of claim 19, wherein the one or more timing parameters specify one or more of:
  an interval length for refreshing different partitions of data of the storage object;
  a time when the refresh operation must be completed; and
  one or more conditions to slow down or pause the refresh operation based at least in part on a load of the data store.

\* \* \* \* \*